(12) United States Patent
Georgiev et al.

(10) Patent No.: US 8,749,694 B2
(45) Date of Patent: Jun. 10, 2014

(54) METHODS AND APPARATUS FOR RENDERING FOCUSED PLENOPTIC CAMERA DATA USING SUPER-RESOLVED DEMOSAICING

(75) Inventors: Todor G. Georgiev, Sunnyvale, CA (US); Georgi N. Chunev, Bloomington, IN (US)

(73) Assignee: Adobe Systems Incorporated, San Jose, CA (US)

( * ) Notice: Subject to any disclaimer, the term of this patent is extended or adjusted under 35 U.S.C. 154(b) by 117 days.

(21) Appl. No.: 12/957,312

(22) Filed: Nov. 30, 2010

(65) Prior Publication Data

US 2013/0128068 A1    May 23, 2013

Related U.S. Application Data

(60) Provisional application No. 61/377,821, filed on Aug. 27, 2010.

(51) Int. Cl.
| | |
|---|---|
| *G02B 13/16* | (2006.01) |
| *H04N 5/225* | (2006.01) |
| *G03B 13/00* | (2006.01) |
| *H04N 5/232* | (2006.01) |

(52) U.S. Cl.
USPC .......................................... 348/345; 348/335

(58) Field of Classification Search
CPC .. H04N 5/00; H04N 13/0282; H04N 13/0246
USPC ................................................ 348/345–357
See application file for complete search history.

(56) References Cited

U.S. PATENT DOCUMENTS

| 725,567 A | 4/1903 | Ives |
|---|---|---|
| 2,039,648 A | 5/1936 | Ives |

(Continued)

FOREIGN PATENT DOCUMENTS

| CN | 101588437 | 11/2009 |
|---|---|---|
| CN | 101610353 | 12/2009 |

(Continued)

OTHER PUBLICATIONS

"Non-Final Office Action", U.S. Appl. No. 12/957,316, (Mar. 22, 2013),16 pages.

(Continued)

*Primary Examiner* — Roberto Velez
*Assistant Examiner* — Pritham Prabhakher
(74) *Attorney, Agent, or Firm* — Wolfe-SBMC

(57) ABSTRACT

A super-resolved demosaicing technique for rendering focused plenoptic camera data performs simultaneous super-resolution and demosaicing. The technique renders a high-resolution output image from a plurality of separate microimages in an input image at a specified depth of focus. For each point on an image plane of the output image, the technique determines a line of projection through the microimages in optical phase space according to the current point and angle of projection determined from the depth of focus. For each microimage, the technique applies a kernel centered at a position on the current microimage intersected by the line of projection to accumulate, from pixels at each microimage covered by the kernel at the respective position, values for each color channel weighted according to the kernel. A value for a pixel at the current point in the output image is computed from the accumulated values for the color channels.

20 Claims, 32 Drawing Sheets

(56) References Cited

U.S. PATENT DOCUMENTS

| | | |
|---|---|---|
| 3,743,379 A | 7/1973 | McMahon |
| 3,971,065 A | 7/1976 | Bayer |
| 3,985,419 A | 10/1976 | Matsumoto et al. |
| 4,175,844 A | 11/1979 | Glaser-Inbari |
| 4,180,313 A | 12/1979 | Inuiya |
| 4,193,093 A | 3/1980 | St. Clair |
| 4,230,942 A | 10/1980 | Stauffer |
| 4,580,219 A | 4/1986 | Pelc et al. |
| 4,732,453 A | 3/1988 | De Montebello et al. |
| 4,849,782 A | 7/1989 | Koyama et al. |
| 5,076,687 A | 12/1991 | Adelson |
| 5,125,750 A | 6/1992 | Corle et al. |
| 5,361,127 A | 11/1994 | Daily |
| 5,400,093 A | 3/1995 | Timmers |
| 5,579,445 A | 11/1996 | Loce et al. |
| 5,659,420 A | 8/1997 | Wakai et al. |
| 5,724,122 A | 3/1998 | Oskotsky |
| 5,729,011 A | 3/1998 | Sekiguchi |
| 5,946,077 A | 8/1999 | Nemirovskiy |
| 5,987,164 A | 11/1999 | Szeliski et al. |
| 6,009,188 A | 12/1999 | Cohen et al. |
| 6,097,394 A | 8/2000 | Levoy et al. |
| 6,097,541 A | 8/2000 | Davies et al. |
| 6,137,535 A | 10/2000 | Meyers |
| 6,137,937 A | 10/2000 | Okano et al. |
| 6,268,846 B1 | 7/2001 | Georgiev |
| 6,301,416 B1 | 10/2001 | Okano et al. |
| 6,317,192 B1 | 11/2001 | Silverbrook et al. |
| 6,339,506 B1 | 1/2002 | Wakelin et al. |
| 6,341,183 B1 | 1/2002 | Goldberg |
| 6,351,269 B1 | 2/2002 | Georgiev |
| 6,476,805 B1 | 11/2002 | Shum et al. |
| 6,570,613 B1 | 5/2003 | Howell |
| 6,738,533 B1 | 5/2004 | Shum et al. |
| 6,804,062 B2 | 10/2004 | Atwater et al. |
| 6,831,782 B2 | 12/2004 | Patton et al. |
| 6,838,650 B1 | 1/2005 | Toh |
| 6,842,297 B2 | 1/2005 | Dowski, Jr. |
| 6,961,075 B2 | 11/2005 | Mindler et al. |
| 7,019,671 B2 | 3/2006 | Kawai |
| 7,054,067 B2 | 5/2006 | Okano et al. |
| 7,085,062 B2 | 8/2006 | Hauschild |
| 7,113,231 B2 | 9/2006 | Conner et al. |
| 7,119,319 B2 | 10/2006 | Noto et al. |
| 7,164,446 B2 | 1/2007 | Konishi |
| 7,167,203 B1 | 1/2007 | Yukawa et al. |
| 7,367,537 B2 | 5/2008 | Ibe |
| 7,470,032 B2 | 12/2008 | Damera-Venkata et al. |
| 7,620,309 B2 | 11/2009 | Georgiev |
| 7,723,662 B2 | 5/2010 | Levoy et al. |
| 7,732,744 B2 | 6/2010 | Utagawa |
| 7,792,423 B2 | 9/2010 | Raskar et al. |
| 7,838,814 B2 | 11/2010 | Minhas et al. |
| 7,872,796 B2 | 1/2011 | Georgiev |
| 7,880,794 B2 | 2/2011 | Yamagata et al. |
| 7,916,934 B2 * | 3/2011 | Vetro et al. ............... 382/154 |
| 7,936,392 B2 | 5/2011 | Ng et al. |
| 7,949,252 B1 | 5/2011 | Georgiev |
| 7,956,924 B2 | 6/2011 | Georgiev |
| 7,962,033 B2 | 6/2011 | Georgiev et al. |
| 7,965,936 B2 | 6/2011 | Raskar et al. |
| 7,978,234 B2 | 7/2011 | Yano et al. |
| 8,019,215 B2 | 9/2011 | Georgiev et al. |
| 8,106,994 B2 | 1/2012 | Ichimura |
| 8,126,323 B2 | 2/2012 | Georgiev et al. |
| 8,155,456 B2 | 4/2012 | Babacan et al. |
| 8,160,439 B2 | 4/2012 | Georgiev et al. |
| 8,189,065 B2 | 5/2012 | Georgiev et al. |
| 8,189,089 B1 | 5/2012 | Georgiev |
| 8,228,417 B1 | 7/2012 | Georgiev et al. |
| 8,237,843 B2 | 8/2012 | Yamamoto et al. |
| 8,243,157 B2 | 8/2012 | Ng et al. |
| 8,289,440 B2 | 10/2012 | Knight et al. |
| 8,290,358 B1 | 10/2012 | Georgiev |
| 8,315,476 B1 | 11/2012 | Georgiev et al. |
| 8,330,848 B2 | 12/2012 | Yamamoto |
| 8,345,144 B1 | 1/2013 | Georgiev et al. |
| 8,379,105 B2 | 2/2013 | Georgiev et al. |
| 8,380,060 B2 | 2/2013 | Georgiev et al. |
| 8,390,728 B2 * | 3/2013 | Lim et al. ............... 348/344 |
| 8,400,555 B1 | 3/2013 | Georgiev et al. |
| 8,401,316 B2 | 3/2013 | Babacan |
| 8,471,920 B2 | 6/2013 | Georgiev et al. |
| 8,502,911 B2 | 8/2013 | Yamamoto et al. |
| 8,559,756 B2 | 10/2013 | Georgiev et al. |
| 8,570,426 B2 * | 10/2013 | Pitts et al. ............... 348/345 |
| 8,611,693 B2 | 12/2013 | Intwala et al. |
| 8,665,341 B2 | 3/2014 | Georgiev et al. |
| 2001/0012149 A1 | 8/2001 | Lin et al. |
| 2001/0050813 A1 | 12/2001 | Allio |
| 2002/0140835 A1 | 10/2002 | Silverstein |
| 2002/0159030 A1 | 10/2002 | Frey et al. |
| 2003/0108821 A1 | 6/2003 | Mei et al. |
| 2003/0117511 A1 | 6/2003 | Belz et al. |
| 2003/0156077 A1 | 8/2003 | Balogh |
| 2003/0231255 A1 | 12/2003 | Szajewski et al. |
| 2004/0114807 A1 | 6/2004 | Lelescu et al. |
| 2004/0218830 A1 | 11/2004 | Kang et al. |
| 2004/0223214 A1 | 11/2004 | Atkinson |
| 2005/0080602 A1 | 4/2005 | Snyder et al. |
| 2005/0088714 A1 | 4/2005 | Kremen |
| 2005/0099504 A1 * | 5/2005 | Nayar et al. ............... 348/222.1 |
| 2005/0122418 A1 | 6/2005 | Okita et al. |
| 2005/0243178 A1 | 11/2005 | McConica |
| 2006/0061845 A1 | 3/2006 | Lin |
| 2006/0072029 A1 | 4/2006 | Miyatake et al. |
| 2006/0104542 A1 | 5/2006 | Blake et al. |
| 2006/0109282 A1 | 5/2006 | Lin et al. |
| 2006/0177150 A1 | 8/2006 | Uyttendaele et al. |
| 2007/0091197 A1 | 4/2007 | Okayama et al. |
| 2007/0252074 A1 * | 11/2007 | Ng et al. ............... 250/208.1 |
| 2007/0258096 A1 | 11/2007 | Cui et al. |
| 2007/0285526 A1 | 12/2007 | Mann et al. |
| 2008/0007839 A1 | 1/2008 | Deng et al. |
| 2008/0056549 A1 | 3/2008 | Hamill et al. |
| 2008/0095469 A1 | 4/2008 | Kiser |
| 2008/0107231 A1 | 5/2008 | Miyazaki et al. |
| 2008/0142685 A1 | 6/2008 | Gazeley |
| 2008/0152215 A1 | 6/2008 | Horie et al. |
| 2008/0165270 A1 | 7/2008 | Watanabe et al. |
| 2008/0166063 A1 | 7/2008 | Zeng |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0247623 A1 | 10/2008 | Delso et al. |
| 2009/0002504 A1 | 1/2009 | Yano et al. |
| 2009/0027542 A1 | 1/2009 | Yamamoto et al. |
| 2009/0041381 A1 | 2/2009 | Georgiev |
| 2009/0041448 A1 | 2/2009 | Georgiev |
| 2009/0086304 A1 | 4/2009 | Yurlov et al. |
| 2009/0122175 A1 | 5/2009 | Yamagata |
| 2009/0127440 A1 | 5/2009 | Nakai |
| 2009/0128658 A1 | 5/2009 | Hayasaka et al. |
| 2009/0128669 A1 | 5/2009 | Ng et al. |
| 2009/0140131 A1 * | 6/2009 | Utagawa ............... 250/226 |
| 2009/0167922 A1 | 7/2009 | Perlman et al. |
| 2009/0179142 A1 | 7/2009 | Duparre et al. |
| 2009/0185801 A1 | 7/2009 | Georgiev et al. |
| 2009/0190022 A1 | 7/2009 | Ichimura |
| 2009/0268970 A1 | 10/2009 | Babacan et al. |
| 2009/0295829 A1 | 12/2009 | Georgiev et al. |
| 2009/0316014 A1 | 12/2009 | Lim et al. |
| 2010/0013979 A1 * | 1/2010 | Golub et al. ............... 348/340 |
| 2010/0026852 A1 | 2/2010 | Ng et al. |
| 2010/0085468 A1 | 4/2010 | Park et al. |
| 2010/0091133 A1 * | 4/2010 | Lim et al. ............... 348/223.1 |
| 2010/0097491 A1 | 4/2010 | Farina et al. |
| 2010/0128145 A1 | 5/2010 | Pitts et al. |
| 2010/0141802 A1 | 6/2010 | Knight et al. |
| 2010/0205388 A1 | 8/2010 | MacInnis |
| 2010/0265381 A1 * | 10/2010 | Yamamoto et al. ............... 348/335 |
| 2010/0265386 A1 | 10/2010 | Raskar et al. |
| 2011/0043604 A1 | 2/2011 | Peleg et al. |
| 2011/0063354 A1 | 3/2011 | Enge |

(56) References Cited

U.S. PATENT DOCUMENTS

| | | | |
|---|---|---|---|
| 2011/0069189 A1* | 3/2011 | Venkataraman et al. | 348/218.1 |
| 2011/0141224 A1 | 6/2011 | Stec et al. | |
| 2011/0157387 A1* | 6/2011 | Han et al. | 348/218.1 |
| 2011/0169980 A1 | 7/2011 | Cho et al. | |
| 2011/0211824 A1 | 9/2011 | Georgiev et al. | |
| 2012/0183232 A1 | 7/2012 | Babacan et al. | |
| 2012/0229679 A1 | 9/2012 | Georgiev et al. | |
| 2012/0281072 A1 | 11/2012 | Georgiev et al. | |
| 2013/0120356 A1 | 5/2013 | Georgiev | |
| 2013/0120605 A1 | 5/2013 | Georgiev | |
| 2013/0121615 A1 | 5/2013 | Intwala | |
| 2013/0127901 A1 | 5/2013 | Georgiev et al. | |
| 2013/0128030 A1 | 5/2013 | Georgiev | |
| 2013/0128069 A1 | 5/2013 | Georgiev et al. | |
| 2013/0128077 A1 | 5/2013 | Georgiev | |
| 2013/0128081 A1 | 5/2013 | Georgiev | |
| 2013/0128087 A1 | 5/2013 | Georgiev et al. | |

FOREIGN PATENT DOCUMENTS

| | | |
|---|---|---|
| CN | 807604 | 7/2011 |
| EP | 1548481 | 6/2005 |
| JP | 504669 | 10/1976 |
| JP | 7270791 | 10/1995 |
| JP | 2001330769 | 11/2001 |
| JP | 2004239932 | 8/2004 |
| WO | WO-0137025 | 5/2001 |
| WO | WO-2006057838 | 6/2006 |
| WO | WO-2007044725 | 4/2007 |
| WO | WO-2007115281 | 10/2007 |
| WO | WO-2009151903 | 12/2009 |

OTHER PUBLICATIONS

"Non-Final Office Action", U.S. Appl. No. 12/690,869, (Mar. 26, 2012), 8 pages.
"Non-Final Office Action", U.S. Appl. No. 12/957,322, (Apr. 24, 2013),15 pages.
"Non-Final Office Action", U.S. Appl. No. 13/434,189, (Mar. 7, 2013), 8 pages.
"Notice of Allowance", U.S. Appl. No. 12/186,392, (Mar. 13, 2013), 8 pages.
"Notice of Allowance", U.S. Appl. No. 12/690,869, (Jul. 13, 2012), 7 pages.
Aliaga, et al., "Plenoptic Stitching: A Scalable Method for Reconstructing 30 Interactive Walkthroughs", *Proceedings of the 28th annual conference on Computer graphics and interactive techniques*, (Aug. 2001), pp. 443-450.
Hunt, B. R., "Super-Resolution of Images: Algorithms, Principles, Performance", *International Journal of Imaging Systems and Technology*, vol. 6, (Jan. 1995), 9 pages.
Meng, et al., "An Approach on Hardware Design for Computational Photography Applications based on Light Field Refocusing Algorithm", *Technical Reports CS-2007-15*, University of Virginia, (Nov. 18, 2007), pp. 1-12.
"Final Office Action", U.S. Appl. No. 12/957,320, (Jun. 27, 2013),16 pages.
"Non-Final Office Action", U.S. Appl. No. 12/957,308, (Jul. 25, 2013),18 pages.
"Notice of Allowance", U.S. Appl. No. 13/434,189, (Jul. 10, 2013), 8 pages.
"Supplemental Notice of Allowance", U.S. Appl. No. 12/186,392, (Jul. 19, 2013), 5 pages.
"Final Office Action", U.S. Appl. No. 12/957,308, (Nov. 19, 2013), 21 pages.
"Final Office Action", U.S. Appl. No. 12/957,316, (Sep. 26, 2013),16 pages.
"Final Office Action", U.S. Appl. No. 12/957,322, (Aug. 12, 2013),16 pages.
"Non-Final Office Action", U.S. Appl. No. 13/288,759, (Sep. 11, 2013),11 pages.
"Notice of Allowance", U.S. Appl. No. 12/957,320, (Oct. 16, 2013),10 pages.
"Restriction Requirement", U.S. Appl. No. 12/957,326, (Nov. 25, 2013), 6 pages.
"Supplemental Notice of Allowance", U.S. Appl. No. 12/186,392, (Aug. 27, 2013), 2 pages.
"European Search Report", EP Application No. 09159086.9, (Aug. 14, 2009), 8 pages.
"Final Office Action", U.S. Appl. No. 13/425,306, (Sep. 19, 2012), 7 pages.
"Final Office Action", U.S. Appl. No. 12/130,725, (Jan. 3, 2012), 6 pages.
"Non-Final Office Action", U.S. Appl. No. 12/111,735, (Jul. 28, 2011), 12 pages.
"Non-Final Office Action", U.S. Appl. No. 12/130,725, (Sep. 9, 2011), 7 pages.
"Non-Final Office Action", U.S. Appl. No. 12/186,392, (Apr. 3, 2012), 13 pages.
"Non-Final Office Action", U.S. Appl. No. 12/186,392, (Nov. 19, 2012), 13 pages.
"Non-Final Office Action", U.S. Appl. No. 12/271,389, (Sep. 30, 2010), 7 pages.
"Non-Final Office Action", U.S. Appl. No. 12/474,112, (Oct. 19, 2011), 5 pages.
"Non-Final Office Action", U.S. Appl. No. 12/628,437, (Jul. 30, 2012), 10 pages.
"Non-Final Office Action", U.S. Appl. No. 12/957,320, (Dec. 5, 2012), 11 pages.
"Non-Final Office Action", U.S. Appl. No. 13/103,880, (Aug. 9, 2011), 5 pages.
"Non-Final Office Action", U.S. Appl. No. 13/425,306, (May 31, 2012), 7 pages.
"Non-Final Office Action", U.S. Appl. No. 13/476,638, (Jul. 6, 2012), 6 pages.
"Notice of Allowance", U.S. Appl. No. 12/917,984, (Aug. 21, 2012), 11 pages.
"Notice of Allowance", U.S. Appl. No. 12/111,735, (Dec. 14, 2011), 10 pages.
"Notice of Allowance", U.S. Appl. No. 12/130,725, (Apr. 3, 2012), 8 pages.
"Notice of Allowance", U.S. Appl. No. 12/271,389, (Feb. 2, 2011), 4 pages.
"Notice of Allowance", U.S. Appl. No. 12/271,389, (Jun. 18, 2010), 6 pages.
"Notice of Allowance", U.S. Appl. No. 12/474,112, (Jan. 30, 2012), 5 pages.
"Notice of Allowance", U.S. Appl. No. 12/503,803, (Mar. 20, 2012), 6 pages.
"Notice of Allowance", U.S. Appl. No. 12/628,437, (Dec. 18, 2012), 6 pages.
"Notice of Allowance", U.S. Appl. No. 13/103,880, (Dec. 13, 2011), 5 pages.
"Notice of Allowance", U.S. Appl. No. 13/425,306, (Dec. 10, 2012), 4 pages.
"Notice of Allowance", U.S. Appl. No. 13/429,226, (Dec. 26, 2012), 7 pages.
"Notice of Allowance", U.S. Appl. No. 13/476,638, (Oct. 29, 2012), 4 pages.
"Notice of Allowance", U.S. Appl. No. 13/549,330, (Feb. 7, 2013), 9 pages.
"PyOpenGL 3.x The Python OpenGL Binding", Retrieved from <http://pyopengl.sourceforge.net> on Dec. 21, 2010, 2 pages.
"Restriction Requirement", U.S. Appl. No. 12/111,735, (Apr. 29, 2011), 6 pages.
"Restriction Requirement", U.S. Appl. No. 12/130,725, (Jul. 15, 2011), 5 pages.
"Restriction Requirement", U.S. Appl. No. 12/474,112, (Jul. 28, 2011), 6 pages.
"Restriction Requirement", U.S. Appl. No. 12/957,316, (Jan. 23, 2013), 6 pages.
"Supplemental Notice of Allowance", U.S. Appl. No. 12/271,389, (Feb. 10, 2011), 2 pages.

(56) References Cited

OTHER PUBLICATIONS

"Supplemental Notice of Allowance", U.S. Appl. No. 12/474,112, (Mar. 8, 2012), 2 pages.
"Supplemental Notice of Allowance", U.S. Appl. No. 12/503,803, (Apr. 23, 2012), 13 pages.
"Supplemental Notice of Allowance", U.S. Appl. No. 13/103,880, (Jan. 20, 2012), 2 pages.
U.S. Appl. No. 11/627,141, filed Jan. 25, 2007, 43 pages.
U.S. Appl. No. 11/874,611, filed Oct. 18, 2007, 43 pages.
U.S. Appl. No. 12/111,735, filed Apr. 29, 2008, 44 pages.
U.S. Appl. No. 12/186,396, filed Aug. 5, 2008, 69 pages.
U.S. Appl. No. 12/271,389, filed Nov. 14, 2008, 63 pages.
U.S. Appl. No. 12/474,112, filed May 28, 2009, 75 pages.
U.S. Appl. No. 12/636,168, filed Dec. 11, 2009, 60 pages.
U.S. Appl. No. 12/690,569, filed Jan. 20, 2010, 36 pages.
U.S. Appl. No. 12/690,871, filed Jan. 20, 2010, 105 pages.
U.S. Appl. No. 12/917,984, filed Nov. 2, 2010, 127 pages.
U.S. Appl. No. 12/957,308, filed Nov. 30, 2010, 73 pages.
U.S. Appl. No. 12/957,312, filed Nov. 30, 2010, 91 pages.
U.S. Appl. No. 12/957,316, filed Oct. 30, 2010, 66 pages.
U.S. Appl. No. 12/957,320, filed Nov. 30, 2010, 58 pages.
U.S. Appl. No. 12/957,322, filed Nov. 30, 2010, 53 pages.
U.S. Appl. No. 12/957,326, filed Nov. 30, 2010, 73 pages.
U.S. Appl. No. 13/288,759, filed Nov. 3, 2011, 54 pages.
U.S. Appl. No. 13/288,765, filed Nov. 3, 2011, 50 pages.
U.S. Appl. No. 13/429,765, filed Mar. 23, 2012, 44 pages.
U.S. Appl. No. 13/429,226, filed Mar. 23, 2012, 44 pages.
Adelson, et al., "Single lens stereo with a plenoptic camera", *IEEE Transactions on Pattern Analysis D and Machine Intelligence*, val. 14, issue 2, 99-106, 1992, pp. 99-106.
Adelson, et al., "The Plenoptic Function and the Elements of Early Vision", *Computational models of visual processing (MIT Press)*, (1991), 18 pages.
Aggarwal, Manoj et al., "Split Aperture Imaging for High Dynamic Range", *International Journal of Computer Vision*, (Jan. 2004), 8 pages.
Baker, et al., "Limits on Superresolution and How to Break Them", *IEEE Transactions on Pattern Analysis and Machine Intelligence*, (Jan. 2002), 37 pages.
Bishop, et al., "Light Field Superresolution", In *International Conference on Computational Photography* (Apr. 6-17, 2009), 4 pages.
Borman, et al., "Super-resolution from image sequences—a review", *Proceedings of the 1998 D Midwest Symposium on Circuits and Systems*, Publication Date: Aug. 9-12, 1998, on pp. 374-378, 5 pages.
Brown, et al., "Unsupervised 3D Object Recognition and Reconstruction in Unordered Datasets", In *Proceedings of 5th International Conference on 3D Imaging and Modelling* (301M), (2005), 8 pages.
Capel, et al., "Computer Vision Applied to Super-resolution", *IEEE Signal Processing Magazine*, vol. 20, (Jan. 2003), 10 pages.
Chai, et al., "Plenoptic Sampling", *ACM Transactions Graphics*, (2000), 12 pages.
Chang, et al., "Light Field Compression Using Disparity-Compensated Lifting and Shape Adaptation", *IEEE Transactions on Image Processing*, vol. 15, No. 4 (Apr. 2006), pp. 793-806.
Christensen, et al., "PANOPTES: A thin agile multi-resolution imaging sensor", *Microcuircuit Applications and Critical, Technology Conference (GOMACTech-05)*, (Jan. 2005), 4 Pages.
Debevec, Paul E., et al., "Recovering High Dynamic Range Radiance Maps from Photographs", *ACM Transaction on Graphics, SIGGRAPH 1997 Conference Proceedings*, San Diego, CA, (1997), 10 pages.
Dudley, Dana et al., "Emerging Digital Micromirror Device (DMD) Applications", DLPTM Products New Applications, Texas Instruments, Inc., Copyright 2003 Society of Photo-Optical Instrumentation Engineers., This paper was published in *SPIE Proceedings* vol. 4985, (2003), 12 pages.
Durand, et al., "A Frequency Analysis of Light Transport", *ACM Transactions Graphics*, (2005), 12 pages.
Durand, Fredo "Fast Bilateral filtering for the Display of High-Dynamic-Range Images", *ACM Transactions on Graphics (TOG), Proceedings of the 29th Annual Conference on Computer Graphics and Interactive Techniques SIGGRAPH-02*, vol. 21, Issue 3, (2002), 10 pages.
Elad, et al., "Restoration of a single superresolution image from several blurred, noisy, and undersampled measured images", *IEEE Transactions on Image Processing* Dec. 1997, pp. 1646-1658.
Farsiu, et al., "Advances and challenges in super-resolution", *International Journal of Imaging Systems and Technology*, 2004., pp. 47-57.
Fecker, Ulrich et al., "Transposed Picture Ordering for Dynamic Light Field Coding", *Joint Video Team (JVT) of ISO/ IEC MPEG & ITU-T VGEG (ISO/IEC JTC1/SC29/WG11 and ITU-T SG16 06)*, (Jul. 9, 2004), 8 pages.
Ferrand, et al., "Direct imaging of photonic nanojets", *Optics Express* vol. 16, No. 10, (May 12, 2008), pp. 6930-6940.
Fife, Keith et al., "A 3Mpixel Multi-Aperture Image Sensor With 0.7um Pixels in 0.11um CMOS", *IEEE ISSCC Digest of Technical Papers* (Feb. 2008), pp. 48-49, available at <http://isl.stanford.edu/groups/elgamal/people/kfife/>,(Feb. 2008), 3 pages.
Georgiev, U.S. Appl. No. 12/144,411, filed Jun. 23, 2008, 63 pages.
Georgiev, U.S. Appl. No. 12/574,183, filed Oct. 6, 2009, 30 pages.
Georgiev, U.S. Appl. No. 12/790,677, filed May 28, 2010, 48 pages.
Georgiev, et al., "Depth of Field in Plenoptic Cameras", In *Eurographics 2009—Annex*, (Apr. 2009), 4 pages.
Georgiev, et al., "Light Field Camera Design for Integral View Photography", *Adobe Systems Technical Report*, (2006), 13 pages.
Georgiev, et al., "Light-Field Capture by Multiplexing in the Frequency Domain", *Adobe Technical Report*, (Apr. 2007), 14 pages.
Georgiev, et al., "Morphing Between Multiple Images", *Southern Illinois University at Carbondale, Dept. of Computer Science, Technical Report*, (Apr. 17, 1997), 17 pages.
Georgiev, et al., "Spatio-angular resolution tradeoff in integral photography", *Proc. Eurographics Symposium on Rendering*, 2006, 10 pages.
Georgiev, et al., U.S. Appl. No. 12/690,869, filed Jan. 20, 2010, 103 pages.
Georgiev, et al., U.S. Appl. No. 12/503,803, filed Jul. 15, 2009, 114 pages.
Georgiev, et al., U.S. Appl. No. 12/628,437, filed Dec. 1, 2009, 114 pages.
Gortler, et al., "The Lumigraph", *ACM Trans. Graph.*, 43-54, 1996, pp. 43-54.
Grzeszczuk, et al., "Standard Support for Progressive Encoding, Compression and Interactive Visualization of Surface Light Fields", *Joint Video Tern (JVT) of ISO/IEC MPEG & ITU-T VGEG (ISO/IEC JTC1/SC29/WG11 and ITU-T SG16 06)*, (Nov. 21, 2001), 11 pages.
Guttosch, Rudolph J., "Investigation of Color Aliasing of High Spatial Frequencies and Edges for Bayer-Pattern Sensors and Foveon X3 Direct Image Sensors", *Tech. Rep., Foveon*, 2002, 8 pages.
Horstmeyer, R et al., "Flexible multimodal camera using a light field architecture.", In *Proceedings ICCP 2009*, 2009., pp. 1-8.
Horstmeyer, Roarke et al., "Modified light field architecture for reconfigurable multimode imaging", In *Adaptive Coded Aperture Imaging, Non-Imaging, and Unconventional Imaging Sensor Systems, SPIE*, 2009, 9 pages.
Horstmeyer, Roarke et al., "Pupil plane multiplexing for multi-domain imaging sensors.", In *Society of Photo-Optical Instrumentation Engineers (SPIE) Conference Series*, vol. 7096, Aug. 2008., 10 pages.
Hubel, Paul M., "Foveon Technology and the Changing Landscape of Digital Cameras", *Thirteenth Color Imaging Conference: Color Science and Engineering Systems, Technologies, and Applications*, Scottsdale, Arizona (Nov. 2005), pp. 314-317.
Hubel, Paul M., et al., "Spatial Frequency Response of Color Image Sensors: Bayer Color Filters and Foveon X3", *Proceedings of the SPIE*, vol. 5301, (2004), pp. 1-4.
Intwala, et al., U.S. Appl. No. 12/130,725, filed May 30, 2008, 52 pages.
Isaksen, Aaron "Dynamically Reparameterized Light Fields", Submitted to the Department of Electrical Engineering and Computer Science in partial fulfillment of the requirements for the degree of Master of Science in Electrical Engineering and Computer Science at the Massachusetts Institute of Technology, (Nov. 2000), 79 pages.

(56) References Cited

OTHER PUBLICATIONS

Isaksen, et al., "Dynamically reparameterized light fields", *ACM Trans. Graph.*, 297-306, 2000, pp. 297-306.
Kessenich, et al., "The OpenGL Shading Language", Version: 4.00, Document Revision: 7, (Feb. 12, 2010), 160 pages.
Lee, et al., "Polymorph: Morphing Among Multiple Images", *IEEE Computer Graphics and Applications*, (1998), pp. 60-73.
Levin, et al., "Image and Depth from a Conventional Camera with a Coded Aperture", *ACM Transactions on Graphics, SIGGRAPH 2007 Conference Proceedings*, San Diego, CA, Retrieved from <http://groups.csail.mit.edu/graphics/CodedAperture/CodedAperture-LevinEtAl-SIGGRAPH07.pdf> on Dec. 21, 2012,(2007), 9 pages.
Levoy, et al., "Light Field Rendering", *ACM Trans. Graph.*, 31-42, 1996, pp. 31-42.
Levoy, et al., "Recording and Controlling the 4D Light Field in a Microscope Using Microlens Arrays", *Journal of Microscopy*, vol. 235, Pt 2, (Apr. 7, 2009), 19 pages.
Levoy, Marc "Light Fields and Computational Imaging", *Computer [Online]*, vol. 39, No. 8, XP002501300, (Aug. 2006), pp. 46-55.
Levoy, Mark et al., "Light Field Microscopy", *ACM Transactions on Graphics 25(3), Proceedings of SIGGRAPH*, (2006), 11 pages.
Levoy, Mary "Optical Recipes for Light Microscopes", *Stanford Computer Grpahics Laboratory Technical Memo 2006-001*, (Jun. 20, 2006), 5 pages.
Lin, Zhouchen "Fundamental Limits of Reconstruction-Based Superresolution Algorithms under Local Translation", *IEEE Transactions on Pattern Analysis and Machine Intelligence 26*, 1 (Jan. 2004), 83-97, available at <http://research.microsoft.com/apps/pubs/default.aspx?id=69073>,(Jan. 2004), pp. 83-97.
Lippmann, "Epreuves Reversible Donnant la Sensation Du Relief ("Reversible Prints Providing the Sensation of Depth")", *Journal of Physics 7*, (1908), pp. 821-825.
Lippmann, "Reversible Prints", *Academie des sciences*, (Mar. 1908), 3 pages.
Lippmann, M.G. "Epreuves Reversibles Photographies Integrales ("Reversible Prints. Integral Photographs.")", *Academie des sciences*, Translation,(Mar. 1908), 4 Pages.
Lumsdaine, Andrew et al., "Full Resolution Lightfield Rendering", *Adobe Systems Technical Report*, (Jan. 2008), 12 pages.
Lumsdaine, et al., "The Focused Plenoptic Camera", In *International Conference on Computational Photography*, (Apr. 2009), 8 pages.
Lyon, Richard F., et al., "Eyeing the Camera: into the Next Century", In *Proceedings IS&T/SID 10th Color Imaging Conference*, (2002), 7 pages.
Naemura, et al., "3D Computer Graphics Based on Integral Photography", *Optics Express*, vol. 8, 2, (2001), 8 pages.
Narasimhan, Srinivasa G., et al., "Enhancing resolution along multiple imaging dimensions using pixels.", *IEEE Trans. Pattern Anal. Mach. Intel I.*, 27(4 ), (Apr. 2005), pp. 518-530.
Nayar, et al., "High Dynamic Range Imaging: Spatially Varying Pixel Exposures", *IEEE Conference on Computer Vision and Pattern Recognition*, Jun. 2000, vol. 1, pp. 4 72-4 79, (Jun. 2000), 8 pages.
Nayar, Shree N., et al., "Programmable Imaging using a Digital Micromirror Array", In *Conf. on Computer Vision and Pattern Recognition*, pp. 1: 436-443, 2004, 8 pages.
Neumann, et al., "Eyes from Eyes Analysis of Camera Design Using Plenoptic Video Geometry", XP002509893, (Dec. 2001), 20 pages.
Ng, "Digital Light Field Photography", A Dissertation Submitted to the Dept. of Computer Science and the Commitiee on Graduate Studies of Stanford Univ in Partial fulfillment of the requirements for the degree of Doctor of Philosophy, 203, (Jul. 2006), 203 pages.
Ng, "Fourier slice photography", *International Conference on Computer Graphics and Interactive Techniques Proceedings of ACM SIGGRAPH 2005.*, (2005), 10 pages.
Ng, et al., "Light field photography with a hand-held plenoptic camera", *Stanford University Computer Science Tech Report CSTR 2005-02*, Apr. 2005, 11 pages.
Ng, et al., "Mathematical Analysis of Super-Resolution Methodology", *Signal Processing Magazine, IEEE 20*, 3 (2003), pp. 62-74.
Nickolls, et al., "Scalable Parallel Programming with CUDA", *Queue 6*, 40-53, (Mar. 2008), 14 pages.
Park, Cheol S., et al., "Super-Resolution Image Reconstruction: A Technical Overview", *IEEE Signal Processing Magazine*, vol. 20, Issue 3, (May 2003), 16 pages.
Park, Jong H., et al., "An Ultra Wide Dynamic Range CMOS Image Sensor with a Linear Response", *Proceedings SPIE-IS&T Electronic Imaging, SPIE* vol. 6068, 2006., 8 pages.
Roberts, David E., "History of Lenticular and Related Autostereoscopic Methods", available at <ftp://ftp.umiacs.umd.edu/pub/aagrawal/HistoryOfIntegralImaginq/HistoryOfLenticular.pdf>, (2003), 17 pages.
Schechner, Yoav Y., et al., "Generalized mosaicing", In *ICCV*, pp. 17-25, 2001, 8 pages.
Schechner, Yoav Y., et al., "Generalized Mosaicing: High Dynamic Range in a Wide Field of View", *International Journal of Computer Vision*, 53(3):245-267, (2003), 23 pages.
Schechner, Yoav Y., et al., "Generalized mosaicing: Polarization panorama", *IEEE Trans. Pattern Anal. Mach. Intell.*, 27(4):631-636, 2005., pp. 631-636.
Schechner, Yoaz et al., "Generalized mosaicing: Wide field of view multispectral imaging", *IEEE Trans. Pattern Anal. Mach. Intell.*, 24(1 0):1334-1348, 2002., (Oct. 2002), pp. 1334-1348.
Schultz, Richard R., "Super-Resolution Enhancement of Native Digital Video Versus Digitized NTSC Sequences", In *Proceedings of the Fifth IEEE Southwest Symposium on Image Analysis and Interpretation*, (2002), 5 pages.
Sebe, et al., "Multi-View Geometry Estimation for Light Field Compression", *VMV 2002*, (2002), 8 pages.
Segal, et al., "The OpenGL Graphics System: A Specification", *Version 3.2 (Core Profile)*, (Dec. 7, 2009), 404 pages.
Seitz, et al., "View Morphing", *ACM Transactions Graphics*, (1996), 10 pages.
Shing-Chow, et al., "The Compression of Simplified Dynamic Light Fields", *Proceedings of International Conference on Acoustics, Speech and Signal Processing*, Apr. 6-10, 2003, Hong Kong, val. 3, (Apr. 6, 2003), 4 pages.
Shum, Heung-Yeung et al., "Survey of Image-Based Representations and Compression Techniques", *IEEE Transactions on Circuits and Systems for Video Technology, IEEE Service Center*, vol. 13, No. 11, (Nov. 1, 2003), 18 pages.
Sloan, et al., "Time Critical Lumigraph Rendering", *Proceedings of the 1997 symposium on Interactive 3D graphics*, (Jan. 1997), 7 pages.
Stevens, et al., "Lens Arrays for a Three-dimensional Imaging System", *Journal of Optics A: Pure and Applied Optics, Opt. 4*, (2002), 5 pages.
Stewart, et al., "A New Reconstruction Filter for Undersampled Light Field", *Eurographics Symposium on Rendering*, (2003), 8 pages.
Stone, et al., "OpenCL: The open standard for parallel programming of heterogeneous systems", *Computing in Science & Engineering*, (May 2010), 8 pages.
Tanida, et al., "TOMBO: Thin Obeservation Module by Bound Optics", *Lasers and Electro-Optics Society, 2002. LEOS 2002. The 15th Annual Meeting of the IEEE*, vol. 1 (2002), pp. 233-234.
Todt, et al., "Fast (Spherical) Light Field Rendering with Per-Pixel Depth", *Technical Report, Computer Graphics Group*, University of Siegen, (2007), 8 pages.
Tumblin, Jack et al., "LCIS: A Boundary Hierarchy for Detail-Preserving Contrast Reduction", *ACM Transactions on Graphics, SIGGRAPH 1999 Conference Proceedings*, Los Angeles, CA, pp. 83-90, 1999., pp. 83-90.
Vaish, Vaibhav et al., "Using Plane+ Parallax to Calibrate Dense Camera Arrays", In *Proceedings of IEEE Conference on Computer Vision and Pattern Recognition (CVPR)*, 8 pages.
Veeraraghavan, et al., "Dappled photography: Mask enhanced cameras for heterodyned light fields and coded aperture refocusing", *ACM Trans. Graph.* 26, 3, 69, 2007, 14 pages.
Wang, et al., "Optical virtual imaging at 50 nm lateral resolution with a white-light nanoscope", *Nature Communications*, (Mar. 1, 2011), 13 pages.
Wang, et al., "The optical microscopy with virtual image breaks a record: 50-nm resolution imaging is demonstrated", *Cornell University Library*, (Jun. 2010), 7 pages.

(56) References Cited

OTHER PUBLICATIONS

Wilburn, Bennett et al., "High Performance Imaging Using Large Camera Arrays", In *ACM Transactions Graphics*, (2005), 12 pages.

Wu, et al., "Imaging with Solid Immersion Lenses, Spatial Resolution and Applications", *Proc. IEEE 88*, 1491, (2000), 8 pages.

Wu, et al., "Realization of numerical aperture 2.0 using a gallium phosphide solid immersion lens", *Applied Physics Letters 75*, (1999), 3 pages.

Xiao, Jiangjian et al., "Tri-view Morphing", *Computer Vision and Image Understanding 96*, 3, (2004), pp. 345-366.

Yang, et al., "A Real-Time Distributed Light Field Camera", *Rendering Techniques 2002, Eurographics Workshop Proceedings, PIS*, Italy, Jun. 26-28, 2002, 9 pages.

Zaharia, et al., "Adaptive 3D-DCT Compression Algorithm for Continuous Parallax 3D Integral Imaging", *Signal Processing, Image Communication*, Elsevier Scient Publishers, Amsterdam, NL, vol. 17, No. 3, (Mar. 1, 2002), 12 pages.

Zhang, et al., "A Survey on Image-based Rendering—Representation, Sampling and Compression", *Signal Processing, Image Communication*, Elsevier Science Publishers, vol. 19, No. 1, (Jan. 1, 2004), 28 pages.

Zitnick, et al., "Consistent Segmentation for Optical Flow Estimation", In *Proceedings of IEEE International Conference on Computer Vision (ICCV)*, (2005), 8 pages.

"Non-Final Office Action", U.S. Appl. No. 12/957,322, Jan. 13, 2014, 20 pages.

"Non-Final Office Action", U.S. Appl. No. 12/957,326, Feb. 24, 2014, 8 pages.

"Notice of Allowance", U.S. Appl. No. 12/957,316, Dec. 11, 2013, 13 pages.

"Supplemental Notice of Allowance", U.S. Appl. No. 12/957,320, Jan. 24, 2014, 2 pages.

"Supplemental Notice of Allowance", U.S. Appl. No. 12/957,320, Jan. 30, 2014, 2 pages.

Chang, et al., "Super-Resolution through Neighbor Embedding", Computer Vision and Pattern Recognition, 2004. CVPR 2004. Proceedings of the 2004 IEEE Computer Society Conference, Jul. 2004, 8 pages.

"Notice of Allowance", U.S. Appl. No. 12/957,308, Mar. 28, 2014, 7 pages.

\* cited by examiner

METHODS AND APPARATUS FOR RENDERING FOCUSED PLENOPTIC CAMERA DATA USING SUPER-RESOLVED DEMOSAICING

PRIORITY INFORMATION

This application claims benefit of priority of U.S. Provisional Application Ser. No. 61/377,821 entitled "Methods and Apparatus for Rendering Focused Plenoptic Camera Data using Super-Resolved Demosaicing" filed Aug. 27, 2010, the content of which is incorporated by reference herein in its entirety.

BACKGROUND

Description of the Related Art

In contrast to conventional cameras, light-field, or radiance capturing, cameras sample the four-dimensional (4-D) optical phase space or light-field, and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

The light-field is the radiance density function describing the flow of energy along all rays in three-dimensional (3D) space. Since the description of a ray's position and orientation requires four parameters (e.g., two-dimensional positional information and two-dimensional angular information), the radiance is a four-dimensional (4D) function. This function may be referred to as the plenoptic function. Image photosensor technology, on the other hand, is only two-dimensional, and light-field imagery must therefore be captured and represented in flat (two dimensional) form. A variety of techniques have been developed to transform and capture the 4D radiance in a manner compatible with two-dimensional (2D) photosensor technology. This may be referred to as a flat representation of the four-dimensional (4D) radiance (or light-field), or simply as a flat. These flats are generally captured with a photosensor such as a Bayer array photosensor that captures different channels at different pixels (e.g., four channels, Red, Green, Green, Blue, in a typical Bayer array).

SUMMARY

Various embodiments of methods, apparatus, and computer-readable storage media for rendering focused plenoptic camera data using demosaicing super-resolution are described. Light fields carry a significant amount of information. This information can be used to generate novel effects when rendering. In the focused plenoptic camera, deliberate spatio-angular trade-offs may be made to obtain significant improvements in spatial resolution when compared to conventional plenoptic cameras. The focused plenoptic camera works as an array of microcameras. These microcameras are focused on the photographed object, a unique feature that distinguishes the focused plenoptic camera from conventional plenoptic cameras. Based on this feature, super-resolution techniques may be applied to the focused plenoptic camera and to the rendering of light-fields captured by the focused plenoptic camera.

Color images are generally captured with a photosensor such as a Bayer array photosensor that captures different channels at different pixels (e.g., four channels, Red, Green, Green, Blue, in a typical Bayer array), and thus a conventional pipeline for super-resolving a flat captured with a focused plenoptic camera would first apply a demosaicing technique to demosaic a raw captured image into a color image, and then render the super-resolved results. However, conventional demosaicing modifies the very sensitive subpixel positional data. In more detail, conventional demosaicing effectively shifts all four pixels (e.g., Red, Green, Green, Blue in a typical Bayer array) to put them in the same location, which may damage subpixel displacement information implicitly present in the input image.

Embodiments of a super-resolved demosaicing technique for rendering focused plenoptic camera data are described that perform simultaneous super-resolution and demosaicing. In embodiments, a raw captured image is processed according to the super-resolved demosaicing technique to generate an output image. Super-resolution and demosaicing are performed simultaneously by the super-resolved demosaicing technique, rather than first performing demosaicing to generate a color image and then separately applying a super-resolution rendering algorithm, as in previous techniques. Embodiments of the super-resolved demosaicing technique may thus overcome the above-described shortcomings of the conventional super-resolution processing pipeline.

In a pipeline for processing a flat captured with a focused plenoptic camera to render a super-resolved image according to the super-resolved demosaicing technique, a flat (a 2D representation of a 4D light-field) including a plurality of microimages may be obtained. A depth of focus may be obtained. For example, a user interface may include a user interface element, for example a slider bar, via which a user may interactively select a depth of focus. A super-resolved demosaicing technique may be applied to the microimages in the input image according to a current depth of focus to generate a super-resolved image from the microimages. In at least some embodiments, deconvolution may be applied to the super-resolved image output by the super-resolved demosaicing technique to generate an output super-resolved image.

In at least some embodiments of the super-resolved deconvolution technique, a current point may be obtained. This point corresponds to a point on the super-resolved image for which channel values are to be generated (i.e., RGB values in an RGB color image format). A line of projection through the microimages may be determined according to the current point and an angle of projection determined from the current depth of focus. The method gets a current microimage. A kernel, for example a Gaussian kernel, centered at the position on the current microimage intersected by the line of projection, may be applied to accumulate values for each channel weighted according to the kernel. In accumulating values for each channel at a given microimage, a sampling pattern, relative to the intersection point of the line of projection with the microimage, may be applied to select pixels from which values for particular channels are to be accumulated. If there are more microimages to be processed, the method gets a next microimage and processes it accordingly. After all the microimages have been processed, a color for the current point may be computed from the accumulated values for the channels for this point. For example, the accumulated value for each channel may be normalized according to the kernel.

Figure 1:
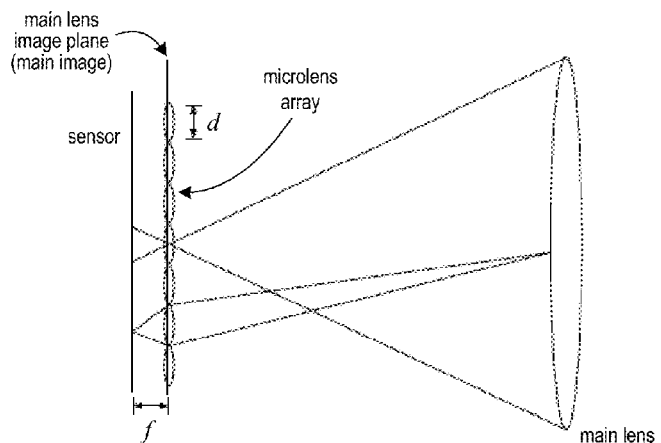
FIG. 1 illustrates a conventional plenoptic camera.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, apparatus, and computer-readable storage media for rendering focused plenoptic camera data using a demosaicing super-resolution technique are described. Light fields carry a significant amount of information. This information can be used to generate novel effects when rendering. In the focused plenoptic camera, deliberate spatio-angular trade-offs may be made to obtain significant improvements in spatial resolution when compared to conventional plenoptic cameras. The focused plenoptic camera works as an array of microcameras. These microcameras are focused on the photographed object, a unique feature that distinguishes the focused plenoptic camera from conventional plenoptic cameras. Based on this feature, super-resolution techniques may be applied to the focused plenoptic camera and to the rendering of light-fields captured by the focused plenoptic camera, for example as described in U.S. patent application Ser. No. 12/690,869, entitled "Super-Resolution with the Focused Plenoptic Camera" filed Jan. 20, 2010.

However, color images are generally captured with a photosensor such as a Bayer array photosensor that captures different channels at different pixels (e.g., four channels, Red, Green, Green, Blue, in a typical Bayer array), and thus a pipeline for super-resolving a flat captured with a focused plenoptic camera, for example as described in U.S. patent application Ser. No. 12/690,869, would first apply a demosaicing technique to demosaic a raw captured image into a color image, and then render the super-resolved results. However, this demosaicing modifies the very sensitive subpixel positional data. In more detail, demosaicing effectively shifts all four pixels (e.g., Red, Green, Green, Blue in a typical Bayer array) to put them in the same location, which may damage subpixel displacement information implicitly present in the input image.

Thus, embodiments of a super-resolved demosaicing technique for rendering focused plenoptic camera data are provided that perform simultaneous super-resolution and demosaicing. In embodiments, a raw image (flat) captured with a focused plenoptic camera is processed according to the super-resolved demosaicing technique to generate an output image or images. In the super-resolved demosaicing technique, super-resolution and demosaicing are performed simultaneously, rather than first performing demosaicing to generate a color image and then separately applying a super-resolution rendering algorithm, as in previous super-resolution techniques. Embodiments of the super-resolved demosaicing technique may thus overcome the shortcomings of the previous super-resolution processing pipeline, for example as described in U.S. patent application Ser. No. 12/690,869.

This document first introduces super-resolution in a focused plenoptic camera, then describes previous super-resolution algorithms for the focused plenoptic camera, and finally describes embodiments of the super-resolved demosaicing technique that performs simultaneous super-resolution and demosaicing to render super-resolved images from flats captured with a focused plenoptic camera.

Super-Resolution in a Focused Plenoptic Camera

Light fields carry a significant amount of information. This information can be used to generate novel effects when rendering. In the focused plenoptic camera (see, e.g., FIGS. 2A and 2B), deliberate spatio-angular trade-offs may be made to obtain significant improvements in spatial resolution when compared to conventional plenoptic cameras (see, e.g., FIG. 1). The focused plenoptic camera works as an array of cameras (technically, an array of microcameras). These microcameras are focused on the photographed object, a unique feature that distinguishes the focused plenoptic camera from conventional plenoptic cameras. Based on this feature, super-resolution techniques may be applied to the focused plenoptic camera and to the rendering of light-fields captured by the focused plenoptic camera.

With the application of super-resolution techniques to the focused plenoptic camera, the attainable spatial resolution of the focused plenoptic camera may be further increased. A factor that has limited the adoption of conventional plenoptic cameras has been the relatively low available resolution. The combination of the focused plenoptic camera with super-resolution techniques as described herein enables images of sizes acceptable to modern photographers, making light-field photography immediately practical.

Embodiments of the focused plenoptic camera capture an array of real images focused on the object. This makes it possible to apply super-resolution techniques to the light-field data captured by a focused plenoptic camera, enabling the focused plenoptic camera to achieve higher spatial resolution. In this section, optical configurations via which a focused plenoptic camera can capture light-field data in images, or flats, suitable for super-resolution techniques are described. An algorithm for super-resolving flats captured with focused plenoptic cameras implementing the optical configurations is described. Experimental results are presented that show an increase in spatial resolution in rendered images when compared to basic focused plenoptic camera rendering approaches, for example as described in U.S. patent application Ser. No. 12/474,112, entitled "Methods and Apparatus for Full-Resolution Light-Field Capture and Rendering" filed May 28, 2009.

In the methods for rendering flats captured with the focused plenoptic camera, for example as described in U.S. patent application Ser. No. 12/474,112, the trade-off between spatial and angular resolution is determined by parameters in the camera optics. Depending on depth, some portions of the scene may have more angular samples (and correspondingly, a lower spatial resolution) than others. As will be shown, these additional samples of the same spatial area of the scene can be used to further increase the spatial resolution of that area through the application of super-resolution techniques as described herein.

In the following discussion, the conventional plenoptic camera and the focused plenoptic camera are compared, particularly in terms of trade-offs in spatial and angular resolution. It will be shown that the focused plenoptic camera is equivalent to an array of cameras, each one focused on the object being imaged. Expressions for the positions and parameters at which super-resolution is possible with the focused plenoptic camera will be derived. Several classes of super-resolution algorithms for the focused plenoptic camera will be developed and analyzed. A method for super-resolving objects at optical infinity with a focused plenoptic camera is described and demonstrated, and experimental results of super-resolution using an example focused plenoptic camera are presented and compared to results of conventional plenoptic cameras and focused plenoptic cameras without super-resolution.

Conventional Plenoptic Cameras

FIG. 1 illustrates a conventional plenoptic camera. Note that the components shown in this Figure are not necessarily to scale relative to each other. A conventional plenoptic camera includes a main lens and a microlens array placed at distance f in front of a photosensor. The microlenses have aperture d and focal length f, and are assumed to be equally spaced at interval d. The main lens is focused at the microlens plane, and the microlenses are focused at optical infinity (equivalently, at the main lens).

Considering that the focal length of the main camera lens is much greater than the focal length of the microlenses, each "microcamera" is focused at the main camera lens aperture, and not on the object being photographed. Each microlens image is thus completely defocused relative to that object, and represents only the angular distribution of the radiance. As a rule, these microimages look blurry and do not represent a human-recognizable image. Since each microlens image samples a given location depending on its position and spans the same angular range, rendering an output image from a conventional plenoptic camera radiance image can be accomplished by integrating all of the pixels under each microlens. Integrating a fixed portion of the pixels under each microlens generates an image of one certain view. In all cases, each microlens contributes to a single pixel in the final image.

The Focused Plenoptic Camera

Figure 2A:
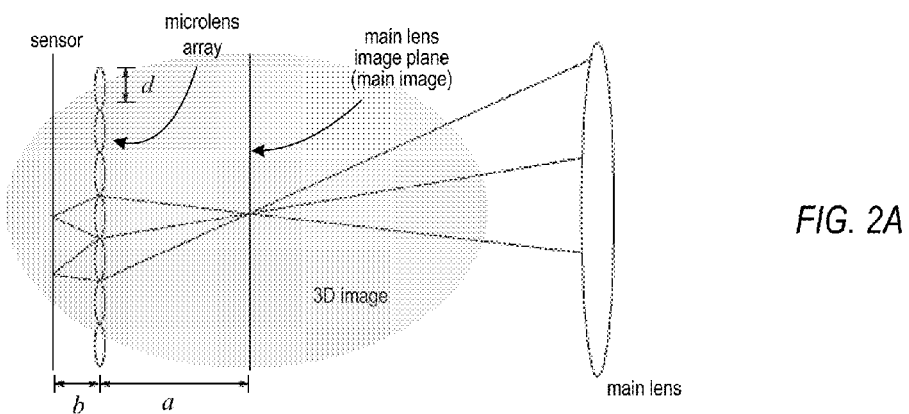
FIG. 2A illustrates an example focused plenoptic camera (Keplerian telescopic case), according to some embodiments.
Figure 2B:
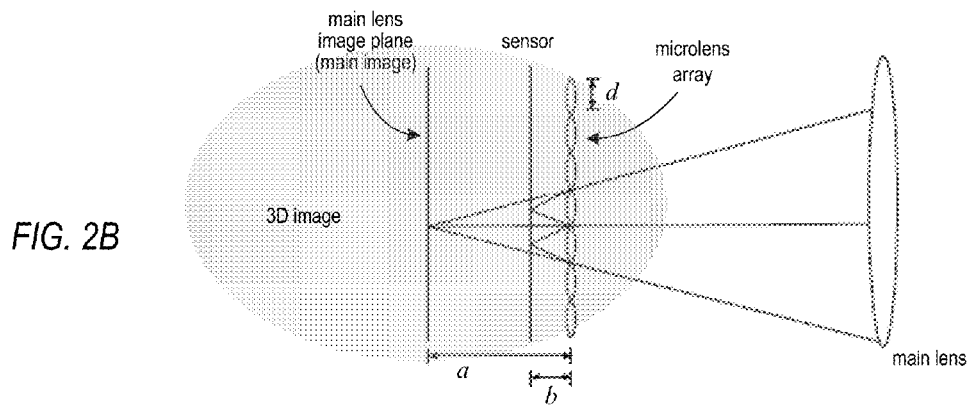
FIG. 2B illustrates an example focused plenoptic camera (Galilean telescopic case), according to some embodiments.

FIGS. 2A and 2B illustrate an example focused plenoptic camera, according to some embodiments. Note that the components shown in FIGS. 2A and 2B are not necessarily to scale relative to each other, nor are the distances between the components necessarily to scale, nor are the sizes of the components necessarily to scale. The focused plenoptic camera may include at least a main lens, a microlens array, and a photosensor. However, in the focused plenoptic camera, the array of "microcameras" is focused on an image plane of the main camera lens instead of at infinity, as in the conventional plenoptic camera shown in FIG. 1. With the focused plenoptic camera, each microcamera is reimaging the main lens image onto the photosensor. The microlenses form an array of true images of the main lens image as a relay system.

The ovoid shaded area in FIGS. 2A and 2B represent the three-dimensional (3D) image formed inside the camera by the main camera lens. Note that this 3D image may extend behind the microlenses. FIG. 2A illustrates the Keplerian telescopic case where the image plane being imaged is in front of the microlenses. If the main lens forms an image behind the microlenses, it is still possible to focus the microlenses on that virtual image so that they form a real image on the photosensor. This is the Galilean telescopic case (see FIG. 2B). In both the Keplerian telescopic case and the Galilean telescopic case, the microlens imaging is described by the lens equation:

$$\frac{1}{a} + \frac{1}{b} = \frac{1}{f}$$

with, respectively, positive a (Keplerian telescopic case) or negative a (Galilean telescopic case). When remapped onto the photosensor, the image of the main lens is reduced in size. This reduction may be denoted as:

$$m = \frac{a}{b}$$

As a result of this scaling, the spatial resolution of the radiance captured by the plenoptic camera is a function of the resolution of the microlens images and the amount of overlap in rendering, and not of the number of microlenses. This decoupling of resolution and number of microlenses is a critical observation that distinguishes the focused plenoptic camera from the conventional plenoptic camera.

Another difference between the conventional plenoptic camera and the focused plenoptic camera is in the nature of the information that is captured by each microlens. In the conventional plenoptic camera, each microlens images one position in the scene, capturing all of the angular information there. In the focused plenoptic camera, different microlenses capture the same position; angular information is spread across microlenses. Accordingly, to render flats captured with the focused plenoptic camera, the rendering algorithm integrates across microlens images, rather than within a single microlens image. That is, assuming that the task is "imaging the image" that is in focus, the rendering algorithm integrates the points in the microlenses that correspond to the same position in the image by overlapping them at a fixed pitch. See U.S. patent application Ser. No. 12/474,112 for examples of basic rendering algorithms for flats captured with embodiments of the focused plenoptic camera.

In order to apply super-resolution techniques to the focused plenoptic camera, the microcamera array needs to be precisely characterized. In particular, the array of microlenses together with the main lens is equivalent to an array of cameras due to the focused plenoptic camera's relay imaging mode of work (see FIGS. 2A and 2B). An array of microcameras observe the "object" in front of them. This "object" is the aerial 3D image of the scene, formed behind the main camera lens, represented as a shaded ovoid in FIGS. 2A and 2B. Since super-resolution is applicable to an array of cameras imaging an object, it is applicable to focused plenoptic camera imaging.

Focused Plenoptic Cameras with Super-Resolution
Super-Resolution Model

The super-resolution problem is to recover a high-resolution source from multiple low-resolution observations. The low-resolution observations may be produced in a variety of different ways, depending on the application. They may be captured by a camera array, a single shifted camera, or they may even be different frames of a video sequence.

Figure 3:
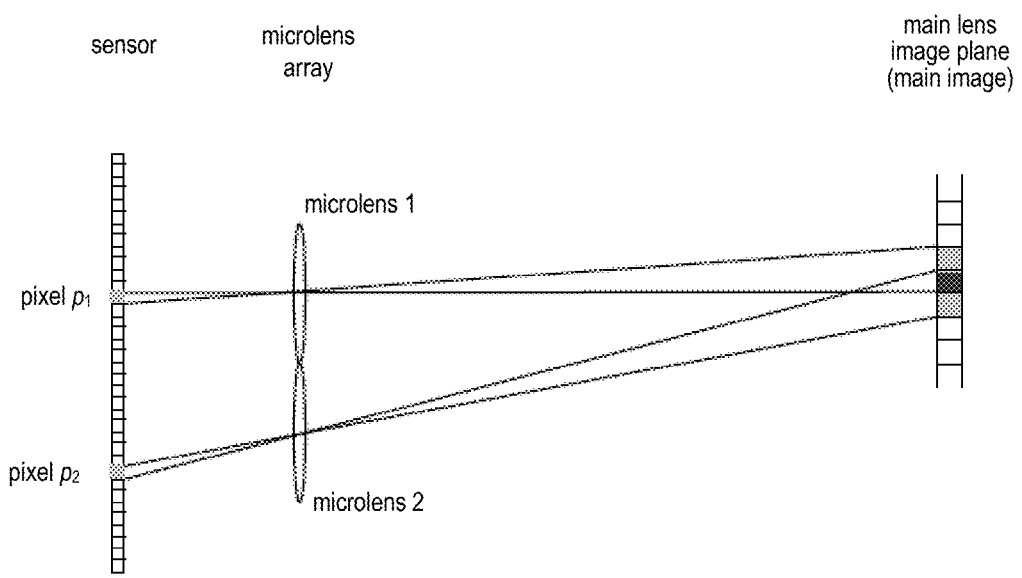
FIG. 3 graphically illustrates low-resolution acquisition of a high-resolution image in a focused plenoptic camera according to some embodiments.
Figure 4:
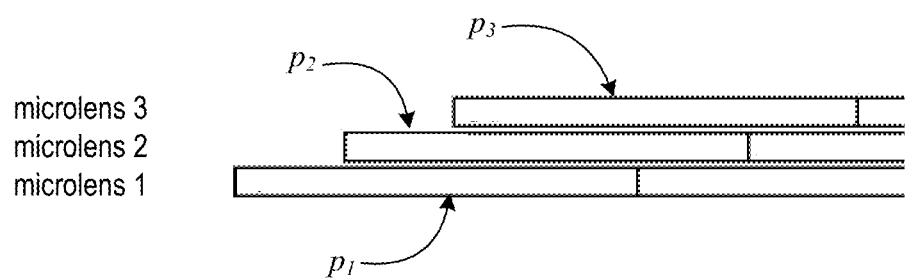
FIG. 4 graphically illustrates three overlapping pixels in a sampling area.

FIG. 3 illustrates low-resolution acquisition of a high-resolution image in a focused plenoptic camera according to some embodiments. The microlenses sample overlapping regions of the high-resolution image generated by the main camera lens. The image-acquisition process in the focused plenoptic camera as shown in FIG. 3 is modeled as follows. A pixel $p_1$ under microlens 1 samples radiance within a certain angle from a given spatial area in the main lens image (in front of the microlenses). In the same way, a pixel $p_2$ under microlens 2 samples an area partially overlapping with the area sampled by $p_1$, i.e., an area shifted by a subpixel amount. In FIG. 3, the overlapping area for pixels $p_1$ and $p_2$ is the darker shaded area of the main image. A pixel $p_3$ under microlens 3 (not shown in FIG. 3) samples an area partially overlapping with the area sampled by $p_1$ and $p_2$, and so on. FIG. 4 graphically illustrates three overlapping pixels ($p_1$, $p_2$, $p_3$) in a sampling area. In FIG. 4, for illustrative purposes, the pixels are mapped from the photosensor to the area sampled and placed on top of each other in space.

Each of the pixels samples a version of the outside world scene, blurred through the kernel of the focused plenoptic camera optics. This includes both the main lens and microlens corresponding to the pixel. In addition, the final pixel value is the result of the convolution of that blurred image with the point-spread function of the pixel photosensor's responsivity. The total kernel may be represented as H with an added noise term. This is an analysis of super-resolution, adapted to the focused plenoptic camera:

$$L = Hx + n \quad (1)$$

where L represents the collected low-resolution observed images, H is the blur matrix, n is a noise term, and x is the high-resolution image that is to be recovered. Recovering x is then cast as a minimization problem:

$$\min_x \{\|Hx - L\|_2^2 + \alpha R(x)\} \quad (2)$$

where R(f) is a regularization term, the choice of which depends on the application and desired solution characteristics. The minimization problem may then be solved using any one of several techniques.

In super-resolution, there needs to be nonintegral (subpixel) shifts between different aliased observations of the high-resolution images. In the general case, estimating these shifts (and, consequently, forming H) is also part of the super-resolution problem. In the case of the focused plenoptic camera, some of the super-resolution problem is simplified, as the focused plenoptic camera is essentially an array of cameras spaced with predetermined micron precision. On the other hand, the shift between features from one microlens image to the next depends on the scene and the camera optics.

Focused Plenoptic Camera Design for Super-Resolution

Figure 5:
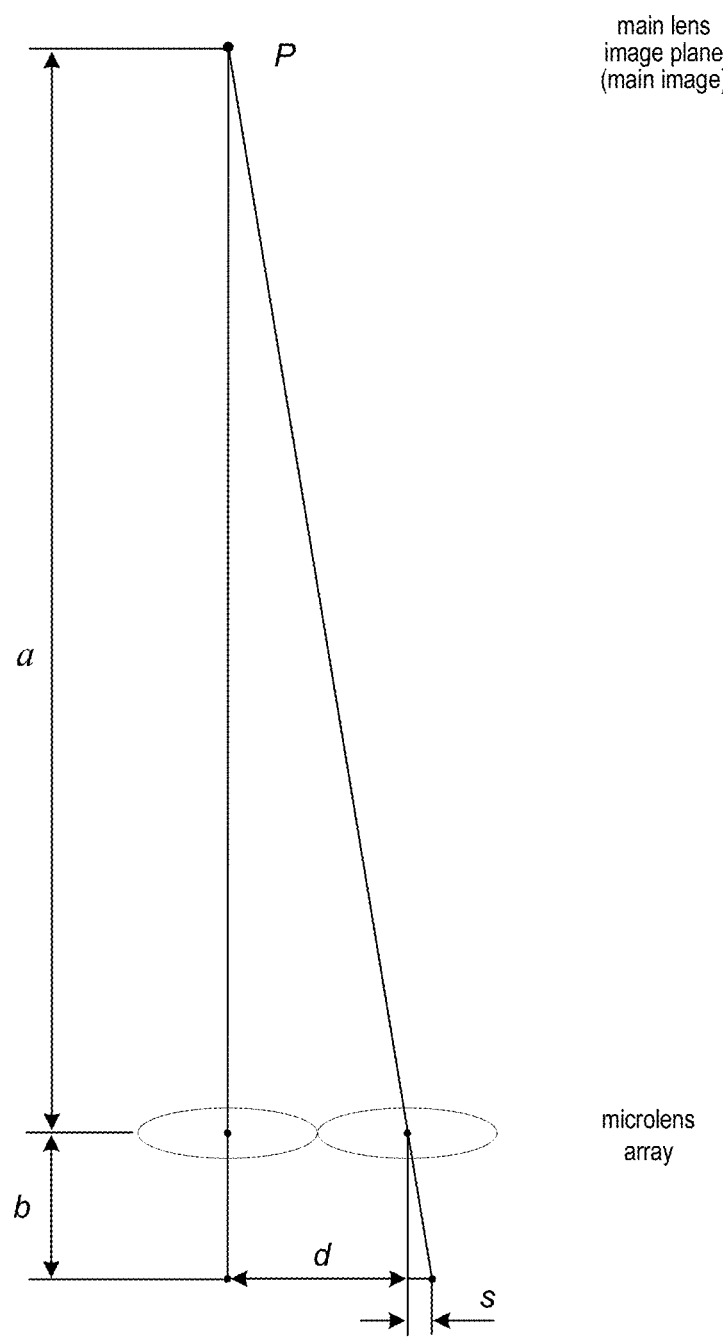
FIG. 5 graphically illustrates the geometry of data capture for super-resolution with the focused plenoptic camera, according to some embodiments.

In this section, methods for designing the optics of the focused plenoptic camera to best support super-resolution are described. FIG. 5 illustrates the geometry of data capture for super-resolution with the focused plenoptic camera, according to some embodiments. As previously discussed, the focused plenoptic camera can be viewed as a relay imaging system, an array of microcameras focused on the image created by the main camera lens. Referring to FIG. 5, consider one luminous point P in the main lens image. FIG. 5 represents the imaging of this point in two microcameras. To be amenable to super-resolution, the distance between the images of the point should be a nonintegral pixel value.

In FIG. 5, it can be seen that $d/a = s/b$. From this observation, $a = db/s$ is derived. Since, in general, the distance d between microlens centers is already not an integer, it would not be appropriate to constrain s as a way of controlling the subpixel shift. Rather, let the next integer larger than d be $\Delta = d + x$ and let $s = x + t$. Since the pixel size and d are known with precision, x is known. Therefore, t is the translation from the integer pixel location to the image of the observed point. In this way, $t = s - x$ is the quantity that is required to have a nonintegral value.

Note that there are multiple regions in the scene (multiple values of a and b) for which t will have a nonintegral value. For instance, for 2×2 super-resolution, t can be taken to be 0.5 pixels, but t can also be taken to be 1.5, or 2.5, or, in general, $0.5 + n$ for $n = 0, 1, 2, 3, \ldots$. After super-resolving, these values for t provide the same 2× increase in the resolution.

The general case is $t = k + n$, where k is a fraction less than 1. Different types of super-resolution can be designed with different k. With this notation, the general equation can be written as:

$$a = \frac{db}{x + k + n} \quad (3)$$

From the above, super-resolution is achieved with microimages shifted by $\Delta + k + n$ pixels.

In the focused plenoptic camera, the portion of the scene that is at optical infinity (i.e., imaged at the largest distance from the microlenses) will have the greatest reduction in size; that is, the lowest spatial resolution under focused plenoptic camera rendering. In addition, since the portion of the scene that is at optical infinity is the farthest from the microlenses, it has the most angular samples. The low resolution and the availability of the most angular samples also means that this region of the scene is generally the most important to use for support of super-resolution.

Different depths in the scene are imaged at different distances a in front of the microlenses. This creates a difficulty for support of super-resolution because the depths would super-resolve at different values of k. Solving this problem requires subpixel registration among all microimages, which may be a difficult problem, as the solution may be computationally expensive or unreliable for automatic super-resolution. In addition, certain depths would not be super-resolvable at all if the shift between microimages happens to be close to or equal to an integral number of pixels. This type of problem has plagued conventional super-resolution methods, and the conventional super-resolution methods still remain too unreliable for commercial image-processing products.

However, the focused plenoptic camera has the unique characteristic that there is one special depth in the scene, the depth of infinity, which is always mapped to the same location in front of the microlenses, one focal length from the main camera lens. Infinity is also the depth that benefits most from focused plenoptic camera super-resolution. This is also the depth that can be handled with highest precision for super-resolution since it is fixed and subpixel correspondence is set and exactly known in advance.

Figure 6:
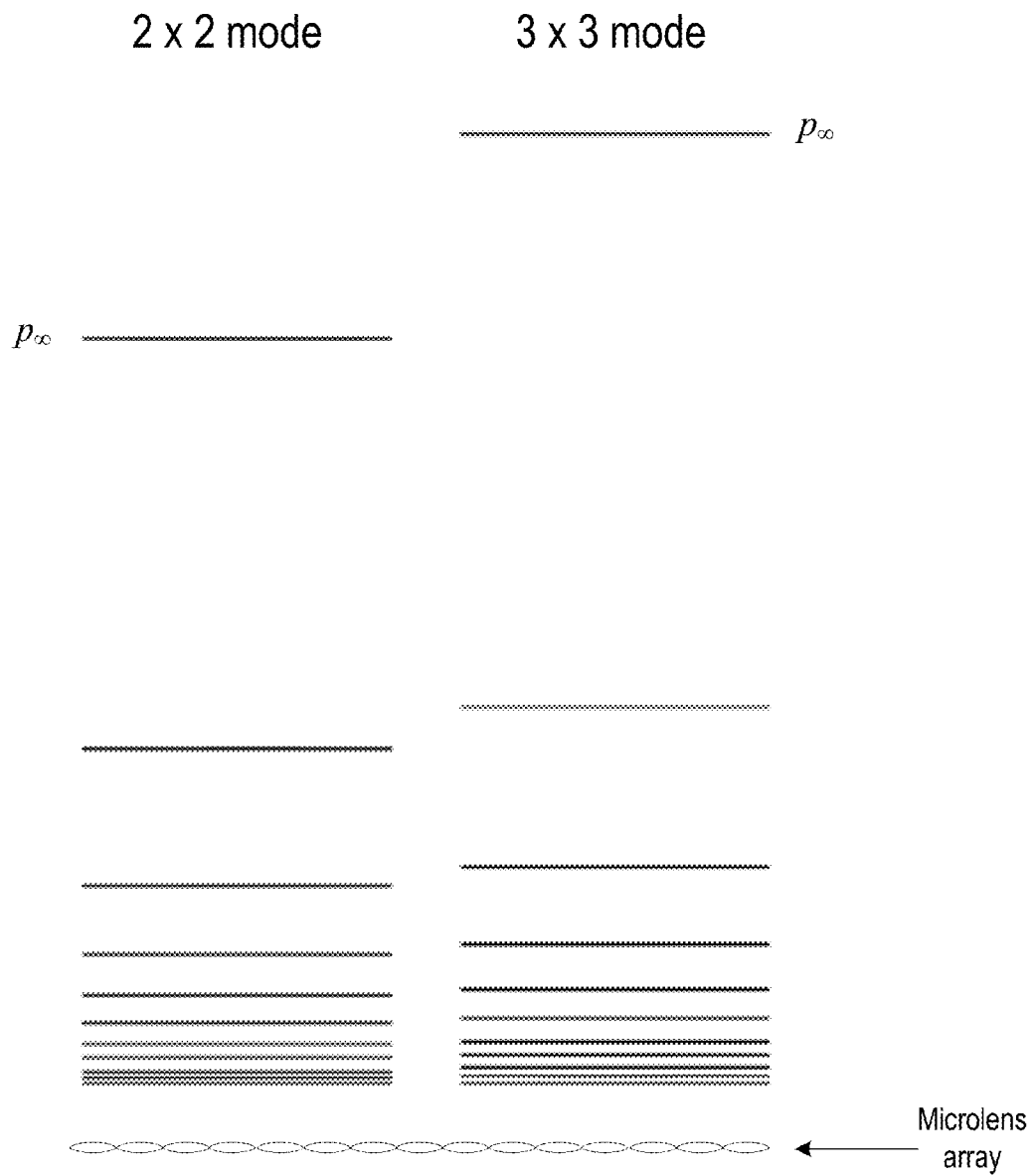
FIG. 6 graphically illustrates planes at different distances from the microlenses at which the focused plenoptic camera super-resolves in 2×2 and 3×3 modes, according to some embodiments.

For a given type of super-resolution (defined by the fraction k) there are a number of planes that satisfy the subpixel shift condition. As these planes approach the microlens array, the planes become closer together, denser and denser; at a certain point their position becomes hard to determine and unreliable (see FIG. 6). FIG. 6 graphically illustrates planes at different distances from the microlenses (represented in the vertical direction) at which the focused plenoptic camera super-resolves in 2×2 and 3×3 modes, according to some embodiments. The plane corresponding to infinity $p_\infty$ is the farthest plane from the microlens array at which there is an image to capture. The separation between this plane and the previous plane is the largest. This makes this the plane with most reliable correspondence, and best for super-resolution.

A focused plenoptic camera may thus be designed and implemented such that infinity is super resolved directly, with registration provided by the camera geometry and the microlens pitch. This avoids estimation of registration from the imagery. At the same time, the registration is much more precise and reliable.

However, while the plane corresponding to infinity $p_\infty$ for a particular super-resolution mode may be best for super-resolution at that mode, the other planes for that mode also work well for super-resolution at that mode. Also note that super-resolution may be used at locations at or near the planes; super-resolution for a given mode will work best when exactly at one of the planes, however, super-resolution will also work satisfactorily for the mode when not exactly at but nearby any of the planes corresponding to that mode.

Another thing to note about FIG. 6 is that the 2×2 and 3×3 super-resolution modes, and other super-resolution modes (e.g., 5×5), may all be realized in the same focused plenoptic camera. Thus, referring to FIG. 6, the 2×2 and 3×3 planes may be overlaid so that the planes are "interleaved", as could planes for one or more other super-resolution modes; there are thus many planes in the focused plenoptic camera at which some level of super resolution (2×2, 3×3, etc.) may be realized. Thus, for a given flat captured with the focused plenoptic camera at some optical setting, there is generally at least one plane at which at least one of the levels of super-resolution may be applied.

Focused Plenoptic Camera with Super-Resolution Design Examples

U.S. patent application Ser. No. 12/474,112 describes example film camera and digital camera embodiments of a focused plenoptic camera that may be configured as described herein to support super-resolution. The parameters of an example physical focused plenoptic camera implementation to support super-resolution are as follows. The microlens pitch of the example focused plenoptic camera is 500 μm and the photosensor pixels are 6.8 μm. Thus, d=73.5294 pixels, Δ=74 pixels, and x=0.4706 pixels. The value for b≈1.6 mm may not be estimated with precision better than 0.1 mm because of the cover glass of the photosensor. However, the value for b may be approximately estimated from known photosensor parameters and independently from the microlens images at different F/numbers. Thus, db≈120 mm is computed. Note that a and b are measured in millimeters, while everything else is measured in pixels (i.e. no units). Also note that these parameters for a focused plenoptic camera that supports super-resolution are given by way of example; other designs for focused plenoptic cameras are possible and contemplated that utilize other values for microlens pitches, photosensor pixel sizes, and so on, and that support super-resolution as described herein.

2×2 Super-Resolution

The following describes super-resolving a focused plenoptic camera image by increasing the size by 2 in each direction (2×2 super-resolution). For 2×2 super-resolution, t=0.5+n, where n=0, 1, 2, 3, . . . and a=db/(x+0.5+n). With the parameters of the example focused plenoptic camera described above, a≈120/(1+n), measured in millimeters. The values of n at which the camera super-resolves and the corresponding distances a (in millimeters) are given in the Table 1. Note that other designs for focused plenoptic cameras may yield different values in Table 1 for 2×2 resolution with the particular design.

TABLE 1

| a | 120 | 60 | 40 | 30 | 24 | 20 | 17.1 | 15 | 13.3 | 12 | 10.9 | 10 | 9.2 |
|---|---|---|---|---|---|---|---|---|---|---|---|---|---|
| n | 0 | 1 | 2 | 3 | 4 | 5 | 6 | 7 | 8 | 9 | 10 | 11 | 12 |

3×3 Super-Resolution

The following describes super-resolving a focused plenoptic camera image by increasing the size by 3 in each direction (3×3 super-resolution). To super resolve a focused plenoptic camera image three times in each direction, t=⅓+n, where n=0, 1, 2, 3, . . . and a=db/(x+⅓+n). With the parameters of the example focused plenoptic camera described above, a≈120/(0.8+n), measured in millimeters. The values of n at which the camera super resolves and the corresponding distances a (in millimeters) are given in Table 2. Note that other designs for focused plenoptic cameras may yield different values in Table 2 for 3×3 resolution with the particular design.

TABLE 2

| a | 150 | 66.6 | 42.8 | 31.6 | 25 | 20.7 | 17.6 | 15.4 | 13.6 | 12.2 | 11.1 |
|---|---|---|---|---|---|---|---|---|---|---|---|
| n | 0 | 1 | 2 | 3 | 4 | 5 | 6 | 7 | 8 | 9 | 10 |

The depth planes at which the above two types of super-resolution work are graphically represented in FIG. 6. FIG. 6 graphically illustrates planes at different distances from the microlenses (represented in the vertical direction) at which the focused plenoptic camera super resolves in 2×2 and 3×3 mode. The plane corresponding to infinity $p_\infty$ is the farthest plane from the microlens array at which there is an image to capture.

Other modes of super-resolution, such as 5×5, and so on, may be similarly designed and implemented in the focused plenoptic camera, and similar Tables may be generated for the other modes.

The above description focuses on determining the appropriate super-resolution mode to be used from the internal geometry of the focused plenoptic camera. Using these methods and formulas, generally, some plane can be identified from the geometry of the camera at which one of the super-resolution modes can be applied. The pixel size, microlens pitch, distance from the microlenses to the photosensor, and other aspects of the internal camera geometry are known with precision; these geometry parameters may thus be used to identify an appropriate super-resolution mode to apply to a given image captured at some setting of the camera. In some embodiments, if a focal plane suitable for super-resolution at some super-resolution level cannot be identified from the camera geometry, the focused plenoptic camera rendering method may fall back on a super-resolution method that analyzes the microimages in the flat to determine subpixel shift, and super-resolution may then be applied according to the analytically determined subpixel shift, rather than according to the method that relies on the known geometry of the camera. Note, however, that in super-resolution, there needs to be nonintegral (subpixel) shifts between different aliased observations of the high-resolution images; at integral values for the subpixel shift, super-resolution is not applicable.

Super-Resolution Algorithms for the Focused Plenoptic Camera

Figure 7:
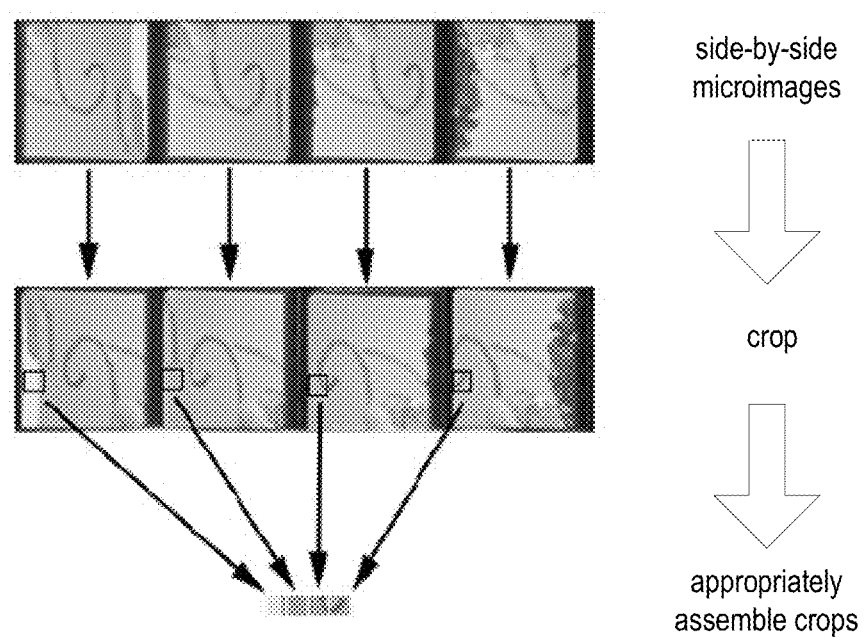
FIG. 7 graphically illustrates a rendering method for flats captured with the focused plenoptic camera without super-resolution.

FIG. 7 graphically illustrates a rendering method or pipeline for flats captured with the focused plenoptic camera without super-resolution. The rectangles in the images of the second row illustrate crops from the four side-by-side microimages. The bottom row shows the four crops as appropriately assembled in the output image.

However, this rendering method tends to waste pixels. Applying super-resolution to the rendering process allows more pixels from each microimage to be used. The method may broadly be stated as making the crop squares larger so that, on each image, the portion covered by the crop square is overlapping some portion of the crop square from the next image. Note that the two crop squares are imaging the same pixels in some overlapping range. Also note that two, three or more microimages may overlap (see, e.g., FIG. 4). Where the microimages overlap, the overlapping portion may be used to increase the resolution via the super-resolution method as described herein, thereby increasing the resolution of the resulting output image.

The following broadly describes a super-resolution algorithm that may be used, for example, to render super-resolved images from flats captured with a focused plenoptic camera appropriately configured for super-resolution as described herein. To solve equation (1) in the example 3×3 case, the following general approach may be used in some embodiments. This algorithm may be adapted for use at other levels of super-resolution (2×2, 5×5, etc.).

Create a high-resolution observed image by interleaving pixels from adjacent microlens images. In the examples given herein, a 3×3 resolution increase is generally used, so each microlens image interleaves pixels from its eight nearest neighbors.

Solve equation (1) (L=Hx+n) with an appropriate computational method. In some embodiments, a deconvolution method with Gaussian and sparse priors may be used. The kernel used for deconvolution may be obtained, for example, by imaging a point light source (pinhole). Other embodiments may use other computational methods to solve equation (1).

Figure 8:
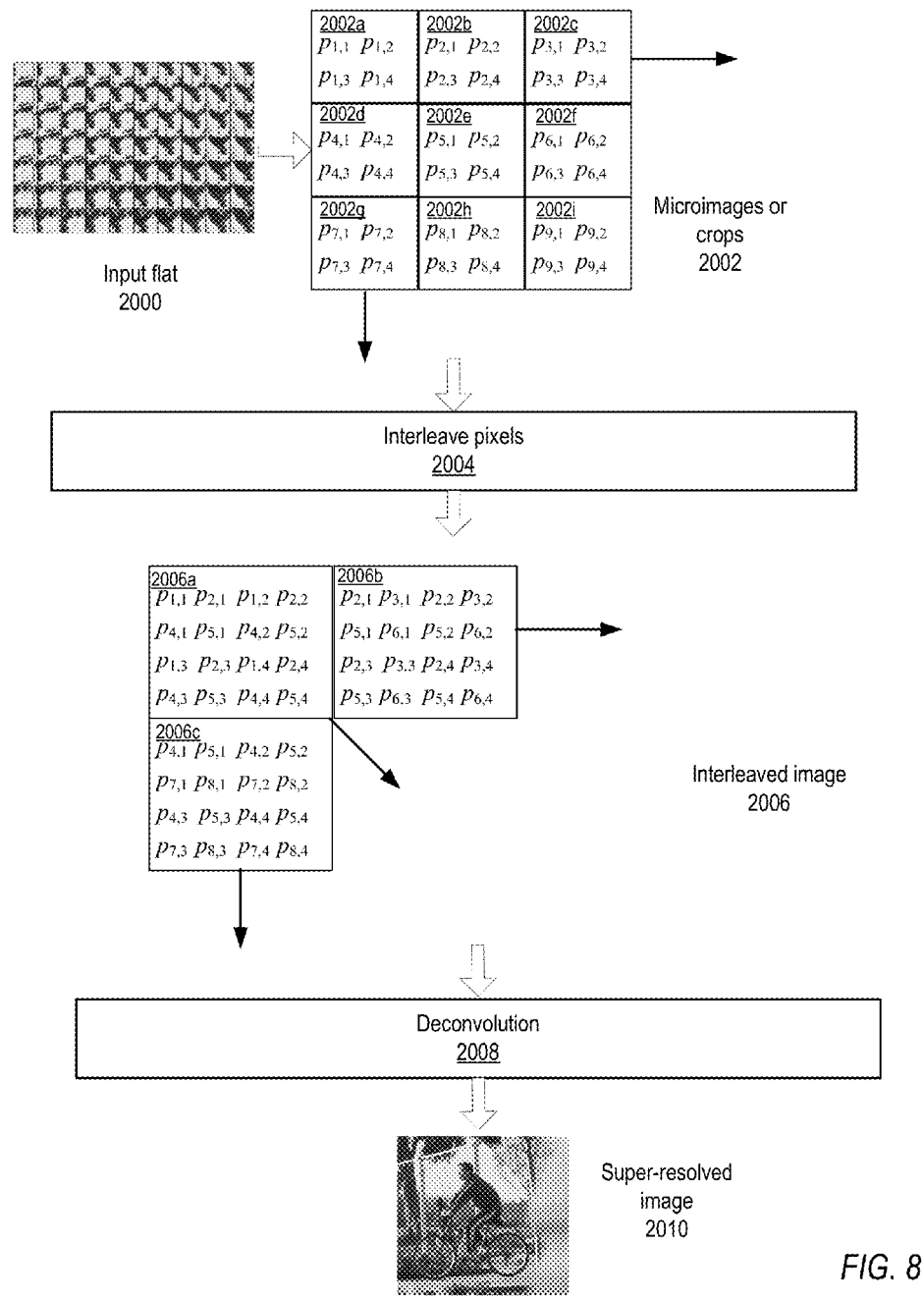
FIG. 8 graphically illustrates a super-resolution rendering algorithm, according to some embodiments.

FIG. 8 graphically illustrates a super-resolution rendering algorithm, according to some embodiments, as applied to a simple example of 2×2 super-resolution, where each "crop" or microimage includes four pixels. Input flat 2000 represents a portion of a flat captured with an implementation of the focused plenoptic camera. Microimages or crops 2002 represent pixels in a subset of the microimages, or in crops selected from the microimages, alphanumerically. For example, a first microimage/crop 2002 includes pixels ($p_{1,1}$, $p_{1,2}$, $p_{1,3}$, $p_{1,4}$). At 2004, the pixels from the microimages are interleaved; since 2×2 super-resolution is being performed, the pixels from four adjacent microimages are interleaved. The output of interleaving 2004 is a raw interleaved image 2006. The interleaved image 2006 is constructed from multiple subimages, each including multiple (four, for 2×2 super-resolution) interleaved microimages or crops 2002 appropriately assembled. For example, subimage 2006a includes interleaved pixels from 2002a, 2002b, 2002d, and 2002e, subimage 2006b includes interleaved pixels from 2002b, 2002c, 2002e, and 2002f, and subimage 2006c includes interleaved pixels from 2002d, 2002e, 2002g, and 2002h.

After interleaved image 2006 is constructed, a deconvolution technique, or some other technique, may be applied to the image to generate the output super-resolved image 2010. Since each pixel of the interleaved image 2006 is sampled from a large area of the main image in the camera and not from a point, interleaving the pixels tends to blur the image, which is sharp in the main image at the image plane captured by the microlenses. Deconvolution, or some other technique, may be applied to remove the blur.

Figure 9:
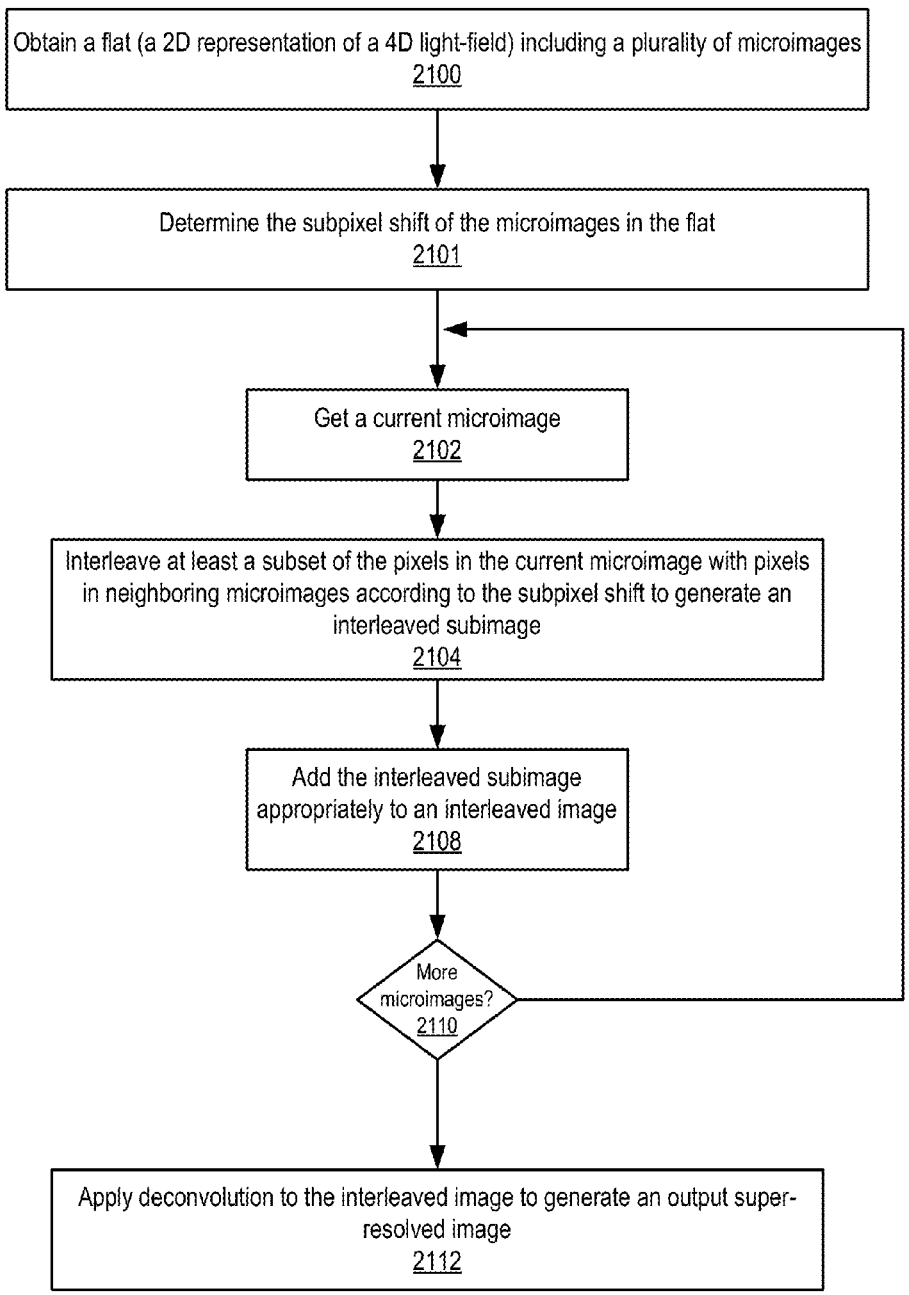
FIG. 9 is a flowchart of a general method for applying super-resolution to flats captured with a focused plenoptic camera, according to some embodiments.

FIG. 9 is a flowchart of a general method for applying super-resolution to flats captured with a focused plenoptic camera, according to some embodiments. As indicated at 2100, a flat (a 2D representation of a 4D light-field) including a plurality of microimages may be obtained. The flat may have been captured by a focused plenoptic camera appropriately configured to support super-resolution, and may have been captured according to an appropriate optical setting to support super-resolution (see, for example, Tables 1 and 2).

As indicated at 2101, the method may determine a subpixel shift that indicates the amount of overlap of the pixels in the microimages. In some embodiments, determining the subpixel shift may be performed by determining the subpixel shift according to configuration values of the focused plenoptic camera used to capture the flat. The configuration values may include pitch of the microlenses in a microlens array of the focused plenoptic camera, distance from the microlenses to a photosensor of the focused plenoptic camera, and distance from the microlenses to an image plane of an objective lens of the focused plenoptic camera at which the flat was captured. In some embodiments, the subpixel shift may alternatively be determined according to an analysis of at least two of the microimages that include overlapping portions of the image of the scene.

The method may iterate over the microimages in the flat to generate an interleaved image. As indicated at 2102, a current microimage may be obtained. As indicated at 2104, at least a subset of the pixels in the current microimage may be interleaved with pixels in neighboring microimages according to the subpixel shift to generate an interleaved subimage. For example, in 2×2 super-resolution, at least a subset of the pixels of the current microimage may be interleaved with pixels from three neighbor microimages; in 3×3 super-resolution, at least a subset of the pixels of the current microimage may be interleaved with pixels from eight neighbor microimages. The subpixel shift may be used to determine the level of super-resolution to be used. For example, a subpixel shift of ½ results in 2×2 super-resolution, a subpixel shift of ⅓ results in 3×3 super-resolution, and so one. Note that the subpixel shift may be approximate, and does not need to be exact, for a level of super-resolution to be used.

As indicated at 2108, the interleaved subimage may be appropriately assembled to generate an interleaved image. Note that in some embodiments the interleaved subimage may be formed directly in interleaved image memory. At 2110, if there are more microimages to be processed, the method returns to 2102 to get a next microimage. Otherwise, the interleaving of the microimages is done, and the output of the process is the interleaved image.

The following is a summary of elements 2102 through 2110 that generalizes the process. Let $L_S$ represent a level of super-resolution determined according to the subpixel shift, where $L_S = (2,3,4, \ldots)$. For each microimage, the pixels of the microimage are interleaved with the pixels of ($L_S^2 - 1$) neighboring microimages that overlap the current microimage to generate an interleaved subimage, where LS is a level of super-resolution determined according to the subpixel shift. The interleaved subimages are appropriately assembled to generate a high-resolution (interleaved) image of the scene.

As indicated at 2112, after the interleaved image is generated, deconvolution or some other technique may be applied to the interleaved image to generate an output super-resolved image. Since each pixel of the interleaved image is sampled from a large area of the main image in the camera and not from a point, interleaving the pixels tends to blur the image, which is sharp in the main image at the image plane captured by the microlenses. Deconvolution, or some other technique, may be applied at 2112 to remove the blur.

In some embodiments, deconvolution may be applied to each subimage individually, rather than applying deconvolution to the interleaved image.

Example Results

The example images presented in FIGS. 10 through 19 were generated using an example focused plenoptic camera implementation and selecting n=8 in Table 2 for 3×3 super-resolution, corresponding to a distance a=13.6 mm in front of the microlenses for this example camera. A relatively large value of n was used because, for lower values of n, the image may be too far from the microlenses and may be too small.

In the example focused plenoptic camera implementation used to capture these example images, the main camera lens is moved forward with a 13 mm extension tube and, the position of the main lens is fine-tuned by changing the focus. Refocusing provides fine-tuning by continuously moving the lens forward between 0 mm and 10 mm. Super-resolution was performed at a shift of Δ+n=82 pixels between captured microimages.

For the example focused plenoptic camera implementation, a medium format camera, using an 80-mm lens and a 39-megapixel digital back, is used. Pixel size is 6.8 µm. The lens is mounted on the camera with a 13 mm extension tube, which provides the needed spacing to establish an appropriate distance from the focal plane to the microlens array and the photosensor as described above. In the example focused plenoptic camera, the microlens array works with the photosensor without removing the cover glass. For that purpose, the microlenses have focal length of 1.5 mm and the array is placed directly on the cover glass of the photosensor, after removing the infrared filter. A method for providing variable additional spacing of up to 0.2 mm is provided for fine-tuning the microlens focus.

U.S. patent application Ser. No. 12/474,112 describes an example embodiment of a focused plenoptic camera based on a large-format film camera that is somewhat similar to the example focused plenoptic camera described in this section. More generally, U.S. patent application Ser. No. 12/474,112 describes example film camera and digital camera embodiments of a focused plenoptic camera which may be configured as described herein to support super-resolution, and further describes both fixed and adjustable embodiments of the focused plenoptic camera. It is noted that these are example embodiments, and are not intended to be limiting. Other embodiments of the focused plenoptic camera are possible and anticipated.

The pitch of the microlenses is 500 µm with a precision better than 1 µm. This precision makes subpixel registration and the method of super-resolution possible. The large pitch makes the microlenses work with an F-number of the main lens as low as 3. Note that if such an array were used with a conventional plenoptic camera, it would result in a final image of size less than 100×100 pixels after rendering. That is why conventional plenoptic camera designs required removal of the cover glass and a very small distance to the photosensor—in order to accommodate a low F-number at small pitch.

Next, the range of depths in the real world at which super-resolution works is estimated. As noted previously, in the example focused plenoptic camera with the appropriate chosen settings for 3×3 super-resolution from Table 2, the image of infinity is formed at distance 13.6 mm from the microlenses, corresponding to n=8. The next closer plane good for 3×3 super-resolution would be at 12.2 mm, and between them there is a plane where super-resolution would fail. Assuming that the image is well super-resolved within 0.5 mm (from 13.1 mm to 13.6 mm), consider the lens equation for the main camera lens:

$$(A-F)(B-F) = F^2 \qquad (4)$$

where F=80 mm is the focal length of the main lens, A is the distance to the object, and B is the distance to the image. The estimate above that B−F=0.5 mm leads to a distance A=12.8 m. Anything that is located at more than 13 m from the camera is well super resolved. Note that this plane can be brought closer by selecting different camera parameters.

The example images presented in FIGS. 10 through 19 were initially captured in color using the example focused plenoptic camera implementation and settings as described above, and have been converted to grayscale for display purposes.

Figure 10:
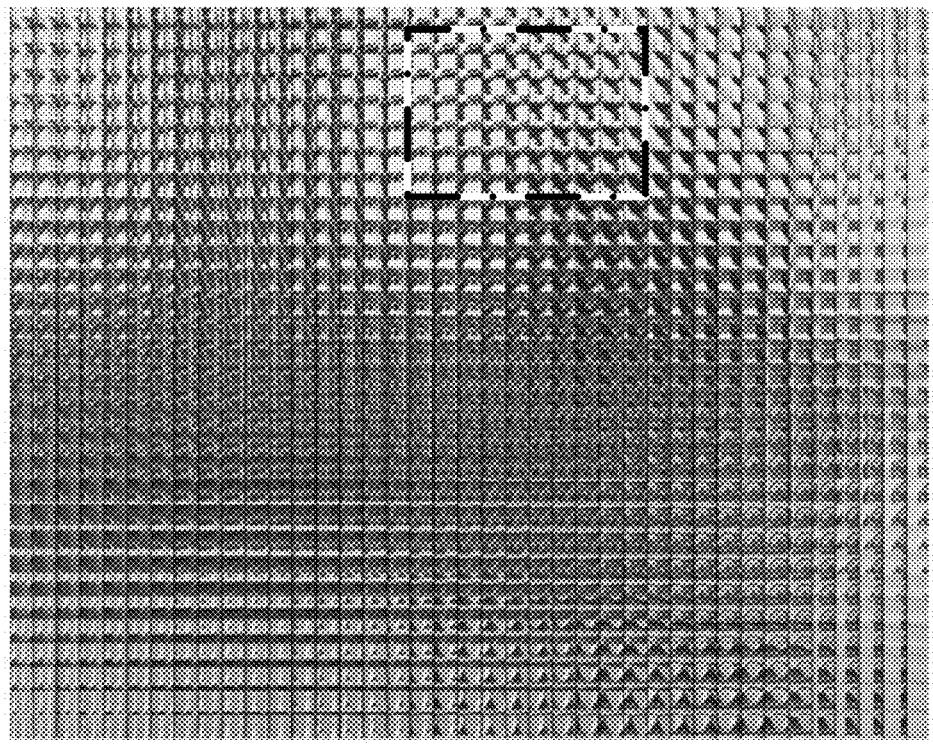
FIG. 10 shows a portion of a light-field image, or flat, captured by the example focused plenoptic camera.
Figure 11:
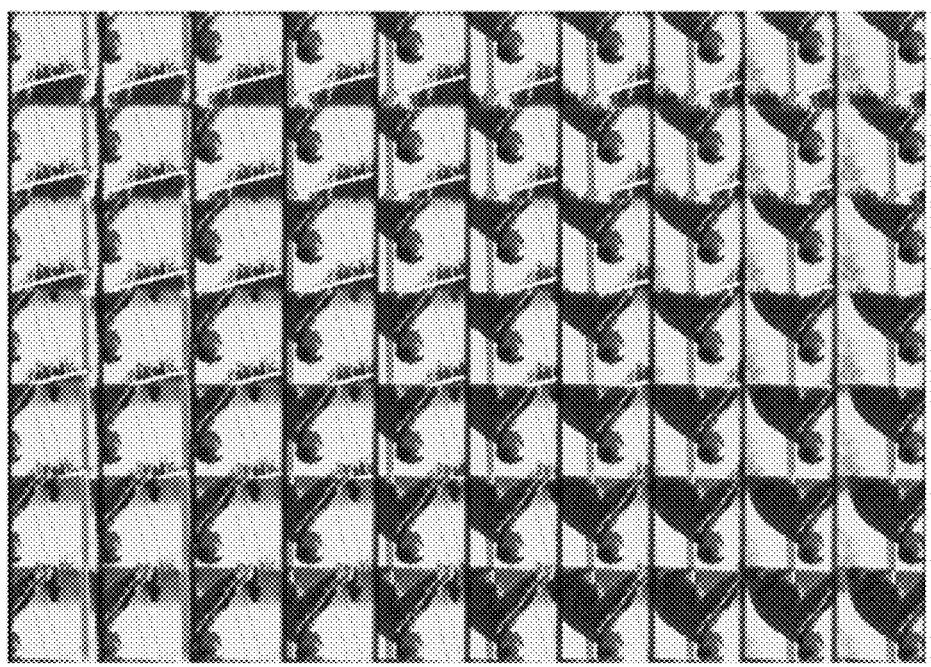
FIG. 11 is a zoom-in to the region indicated by the rectangle in FIG. 10.

FIG. 10 shows a portion of a light-field image, or flat, captured by the example focused plenoptic camera. No part of the image is in focus at the image plane; hence, the light-field image appears blurry at a macro level. However, by closely examining the microimages themselves, it can be seen that the microimages are well focused, as shown in FIG. 11, which is a zoom-in to the region indicated by the rectangle in FIG. 10. Note that a square main lens aperture was used to provide efficient use of photosensor space, so the microimages are squares and not circles.

Figure 12:
FIG. 12 shows a stereo rendering of the captured flat of FIG. 10, rendered using a focused plenoptic camera rendering algorithm without super-resolution.
Figure 12:
Figure 13:
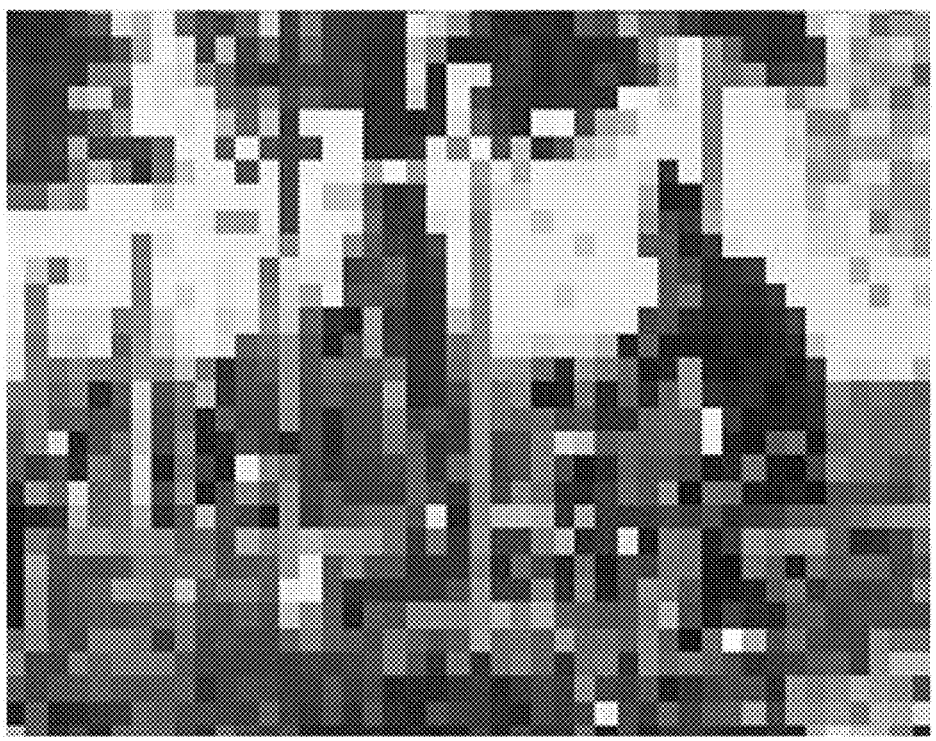
FIG. 13 shows a rendering of the flat of FIG. 10 according to a conventional plenoptic camera rendering technique that uses one pixel per microlens.
Figure 14:
FIG. 14 shows a rendering of the flat of FIG. 10 according to a focused plenoptic camera rendering algorithm without super-resolution.
Figure 15:
FIG. 15 shows a rendering of the flat of FIG. 10 according to a focused plenoptic camera super-resolution rendering algorithm.

FIG. 12 shows a stereo rendering of the captured flat of FIG. 10, rendered using a focused plenoptic camera rendering algorithm without super-resolution. FIGS. 13 through 15 show results of the different rendering approaches. To show the effects of the different rendering approaches more clearly, smaller portions of the image are shown. Rendering the light-field according to conventional plenoptic camera rendering techniques that use one pixel per microlens yields an image with very low resolution, as shown in FIG. 13. A focused plenoptic camera rendering algorithm without super-resolution enables significant resolution improvement, as shown in FIG. 14. A slightly different view of the same light field rendered with a focused plenoptic camera super-resolution rendering algorithm according to some embodiments is shown in FIG. 15. The image in FIG. 15 is clearly of higher resolution than the images in FIGS. 13 and 14.

Figure 16:
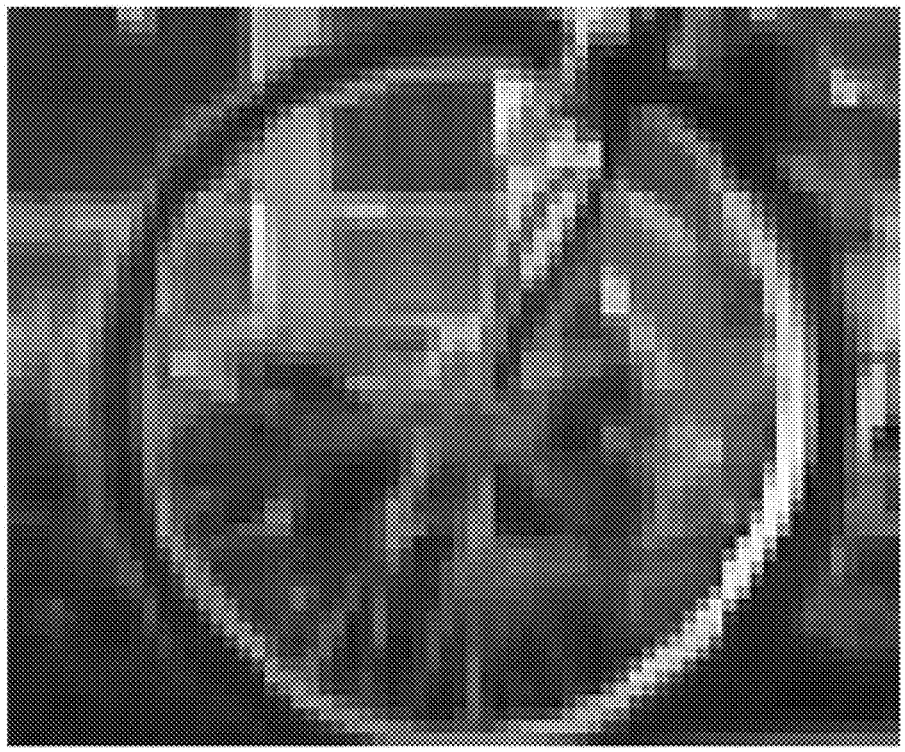
FIG. 16 shows a close-up of the front wheel of the bicycle from FIG. 14, rendered with a focused plenoptic camera rendering algorithm without super-resolution.
Figure 17:
FIG. 17 shows a close-up of the front wheel of the bicycle from FIG. 15, rendered according to a focused plenoptic camera super-resolution rendering algorithm.

FIG. 16 shows a close-up of the front wheel of the bicycle rendered with a focused plenoptic camera rendering algorithm without super-resolution; pixilation is visually evident. FIG. 17 shows a close-up of the front wheel of the bicycle rendered with the focused plenoptic camera and super-resolution, using the focused plenoptic camera super-resolution rendering algorithm according to some embodiments. The image in FIG. 17 is clearly of higher resolution than the image in FIG. 16.

Figure 18:
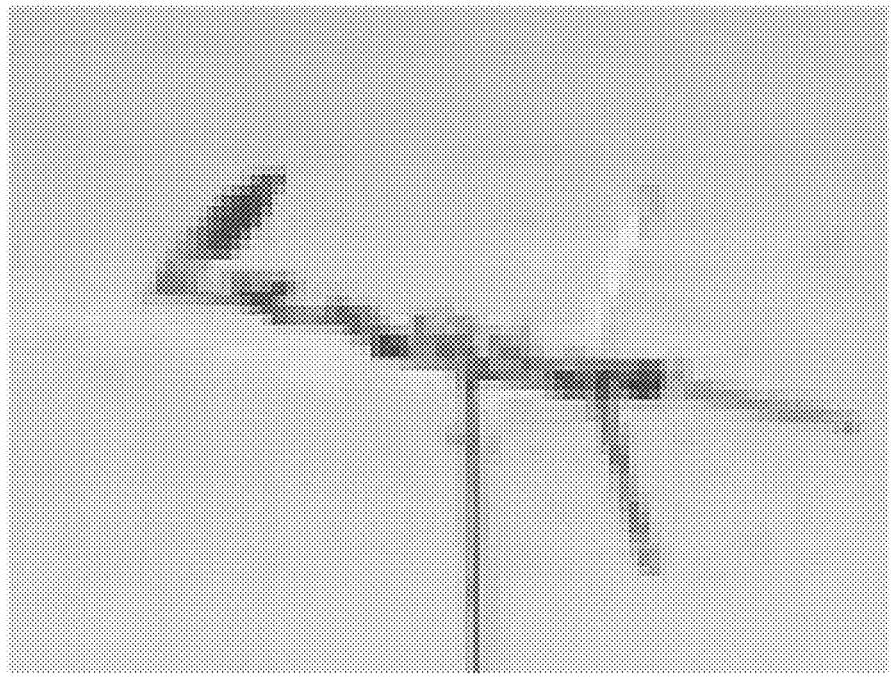
FIG. 18 shows a rendering from light-field data using a focused plenoptic camera rendering algorithm without super-resolution.
Figure 19:
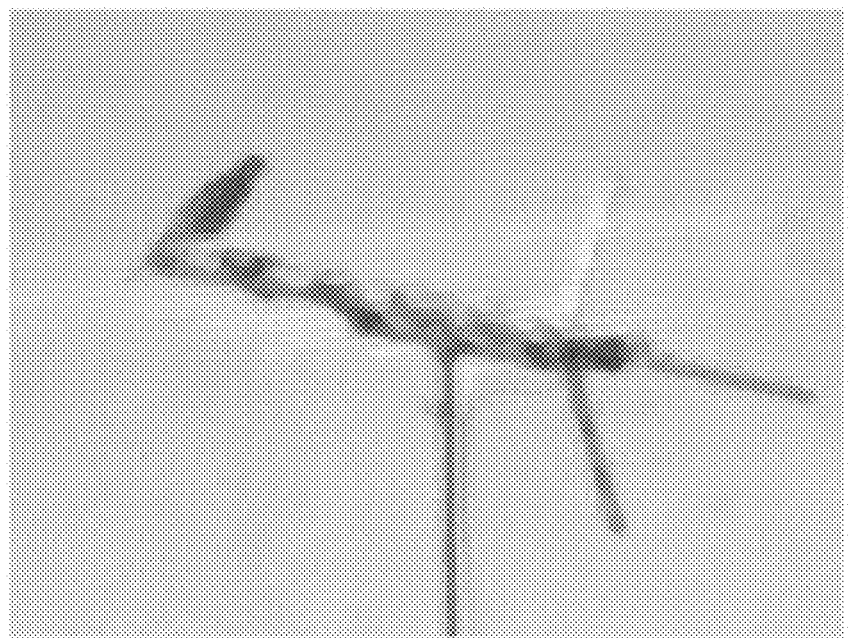
FIG. 19 shows a rendering from the same light-field data used in FIG. 18, but using a focused plenoptic camera super-resolution rendering algorithm.

FIGS. 18 and 19 show an image of a bird on an antenna, rendered from a flat captured with a focused plenoptic camera. The image in FIG. 18 is rendered from the light-field data using a focused plenoptic camera rendering algorithm without super-resolution. The image in FIG. 19 is a super-resolved rendering from the same data, rendered using the focused plenoptic camera super-resolution rendering algorithm according to some embodiments. Pixilation can be clearly seen in the image of FIG. 18, and the improvement gained with super-resolution rendering can be seen in FIG. 19 when compared to FIG. 18.

Figure 20:
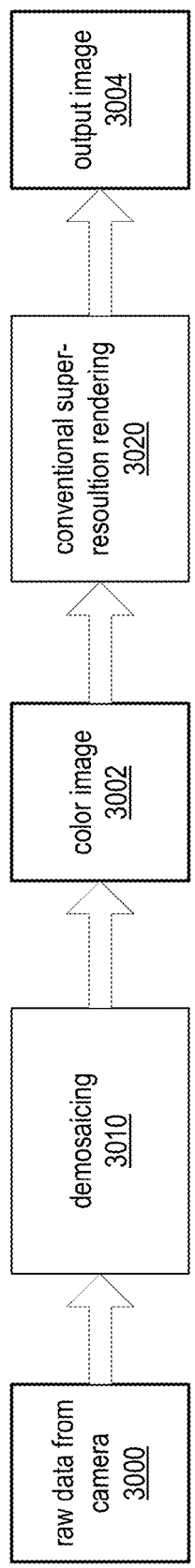
FIG. 20 shows a standard pipeline for super-resolving images.
Figure 21:
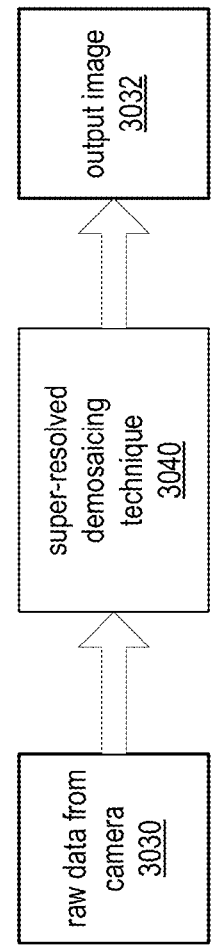
FIG. 21 shows super-resolution processing using a super-resolved demosaicing technique according to embodiments.

Super-Resolved Demosaicing Technique for Rendering Focused Plenoptic Camera Data Methods, apparatus, and computer-readable storage media for rendering focused plenoptic camera data using super-resolved demosaicing are described. FIGS. 20 and 21 compare a standard super-resolution rendering pipeline as illustrated in FIGS. 8 and 9 with a super-resolution rendering pipeline using the super-resolved demosaicing technique. The standard super-resolution rendering techniques for plenoptic camera data as illustrated in FIGS. 8 and 9 produce much better results than direct rendering of plenoptic camera data without super-resolution. However color images are generally captured with a photosensor such as a Bayer array photosensor that captures different channels at different pixels (e.g., four channels, Red, Green, Green, Blue, in a typical Bayer array), and thus the standard pipeline for rendering focused plenoptic camera data, as shown in FIG. 46, would first apply a demosaicing technique 3010 to demosaic a raw captured image 3000 into a color image 3002, and then render the superresolved results according to the super-resolution technique 3020 previously described, for example in reference to FIG. 9, to generate a final image 3004. However, demosaicing modifies the very sensitive subpixel positional data. In more detail, demosaicing effectively shifts all four pixels (e.g., Red, Green, Green, Blue in a typical Bayer array) to put them in the same location, which may damage subpixel displacement information implicitly present in the input image. This makes the super-resolution resolving algorithm as illustrated in FIG. 9 suboptimal.

Thus, embodiments of a super-resolved demosaicing technique for rendering focused plenoptic camera data are described that perform simultaneous super-resolution and demosaicing. FIG. 21 illustrates, at a high level, super-resolution processing using a super-resolved demosaicing technique according to at least some embodiments. As illustrated in FIG. 21, a raw captured image 3030 is processed according to the super-resolved demosaicing technique 3040 to generate an output image 3032. Super-resolution and demosaicing are performed simultaneously by the super-resolved demosaicing technique 3040, rather than first performing demosaicing to generate a color image and then separately applying a super-resolution rendering algorithm, as in the super-resolution rendering pipeline illustrated in FIG. 20. Embodiments of the super-resolved demosaicing technique as illustrated in FIG. 21 may thus overcome the shortcomings of the super-resolution processing pipeline as illustrated in FIG. 20. As shown in example images provided in the Figures, embodiments of the super-resolved demosaicing technique as illustrated in FIG. 21 may provide much better results than the super-resolution rendering pipeline illustrated in FIG. 20.

The "ba" Microlens System

Figure 22:
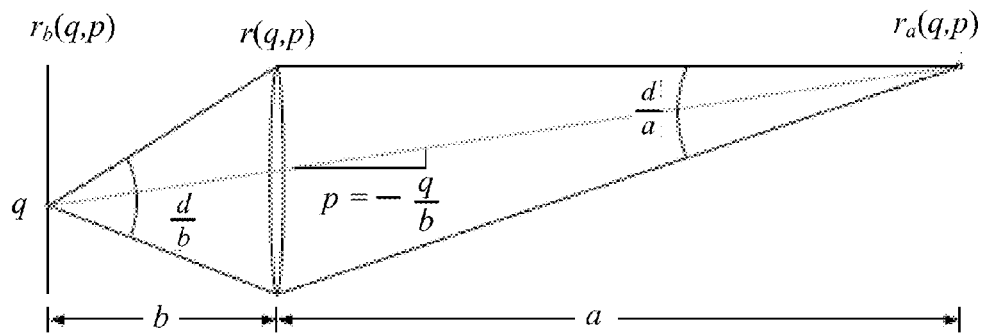
FIG. 22 illustrates the "ba" microlens system of the focused plenoptic camera.

FIG. 22 illustrates the "ba" microlens system of the focused plenoptic camera. Consider one microlens and let $r_a(q, p)$ be the radiance at the focal plane of the main lens and $r_b(q, p)$ be the radiance at the photosensor behind that microlens. The image from the main lens is assumed to be focused on the plane distance a in front of the microlenses, i.e., the imaging plane of the microlenses. Each microlens focuses a portion of the image plane onto the photosensor.

Figure 23:
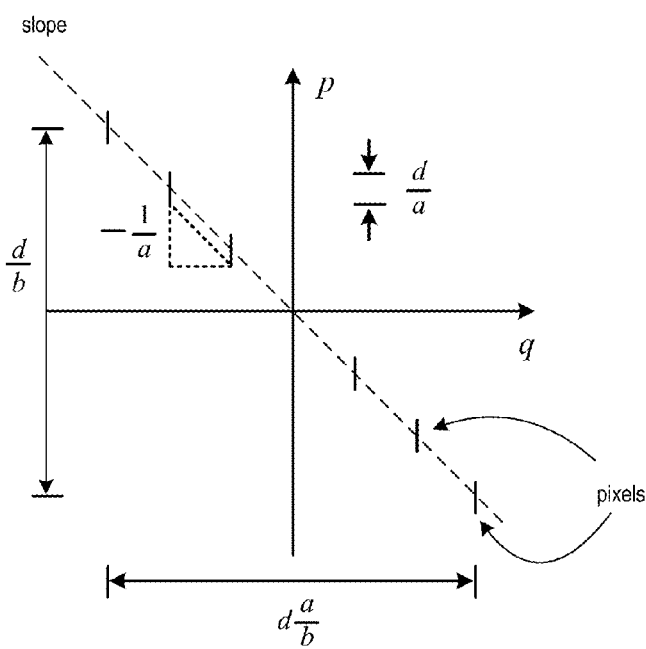
FIG. 23 illustrates sampling radiance by a single microlens.

FIG. 23 illustrates the way that radiance is sampled by a single microlens (infinitely small pixels and microlens aperture d are assumed). This Figure illustrates sampling of the radiance $r_a(q, p)$ by a single microlens represented in the two-dimensional (q, p) plane. Each pixel samples a single position in q (the positional coordinate) and samples a span of d/a in p (the directional coordinate). The entire microlens samples a span of da/b in q (the spatial coordinate).

Figure 24:
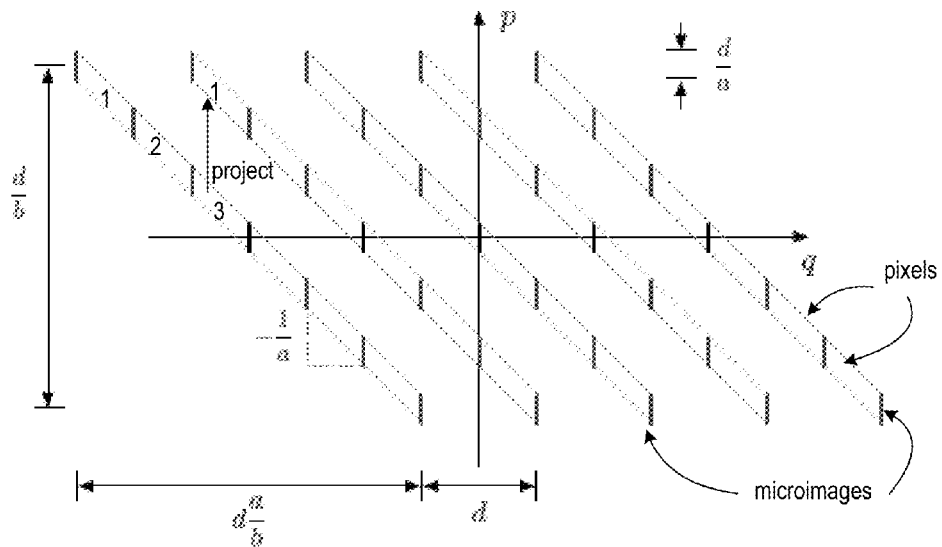
FIG. 24 illustrates sampling of the radiance $r_a(q, p)$ by a microlens array represented in the two-dimensional (q, p) plane.

FIG. 24 illustrates sampling of the radiance $r_a(q, p)$ by a microlens array represented in the two-dimensional (q, p) plane.

Figure 25:
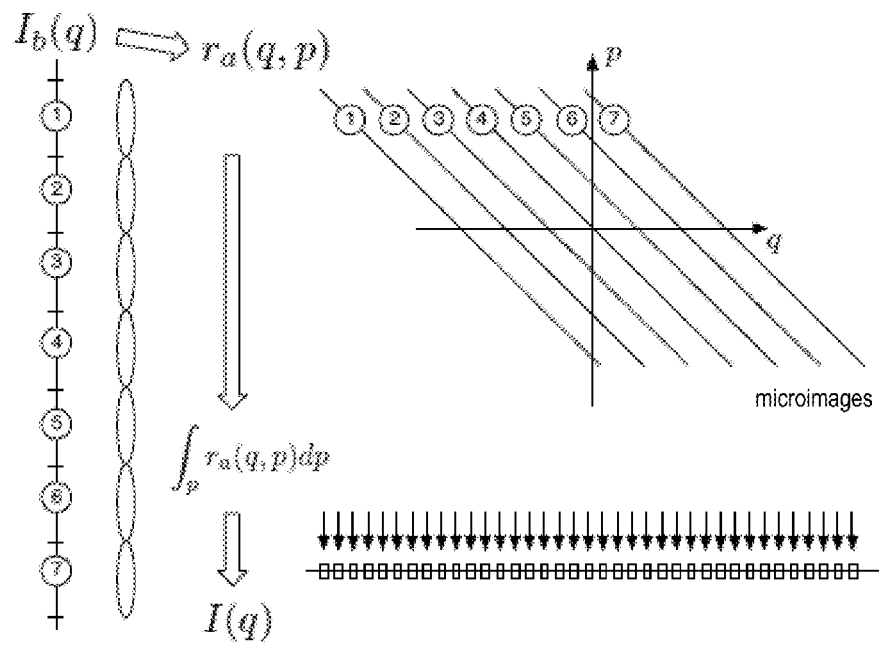
FIG. 25 illustrates rendering of a final image from a captured lightfield in two steps, according to a conventional technique.

FIG. 25 illustrates rendering of a final image from a captured lightfield in two steps, according to the standard super-resolution rendering pipeline as illustrated in FIG. 20. First, the photosensor image $I_b(q)$ is converted into the radiance $r_a(q, p)$. Next, integrate (average) at fixed q over p. The resolution at which integration is performed is determined by the resolution of the microlens images, and not by the number of micro lenses.

Super-Resolved Demosaicing Technique

Image information is lost by performing demosaicing as a separate step first and then super-resolving, as in the standard super-resolution rendering pipeline illustrated in FIG. 20. In embodiments of the super-resolved demosaicing technique, instead of being performed in two discrete steps, demosaicing and super-resolving are performed together, which prevents the loss of information resulting from the standard super-resolution rendering pipeline illustrated in FIG. 20.

Figure 34:
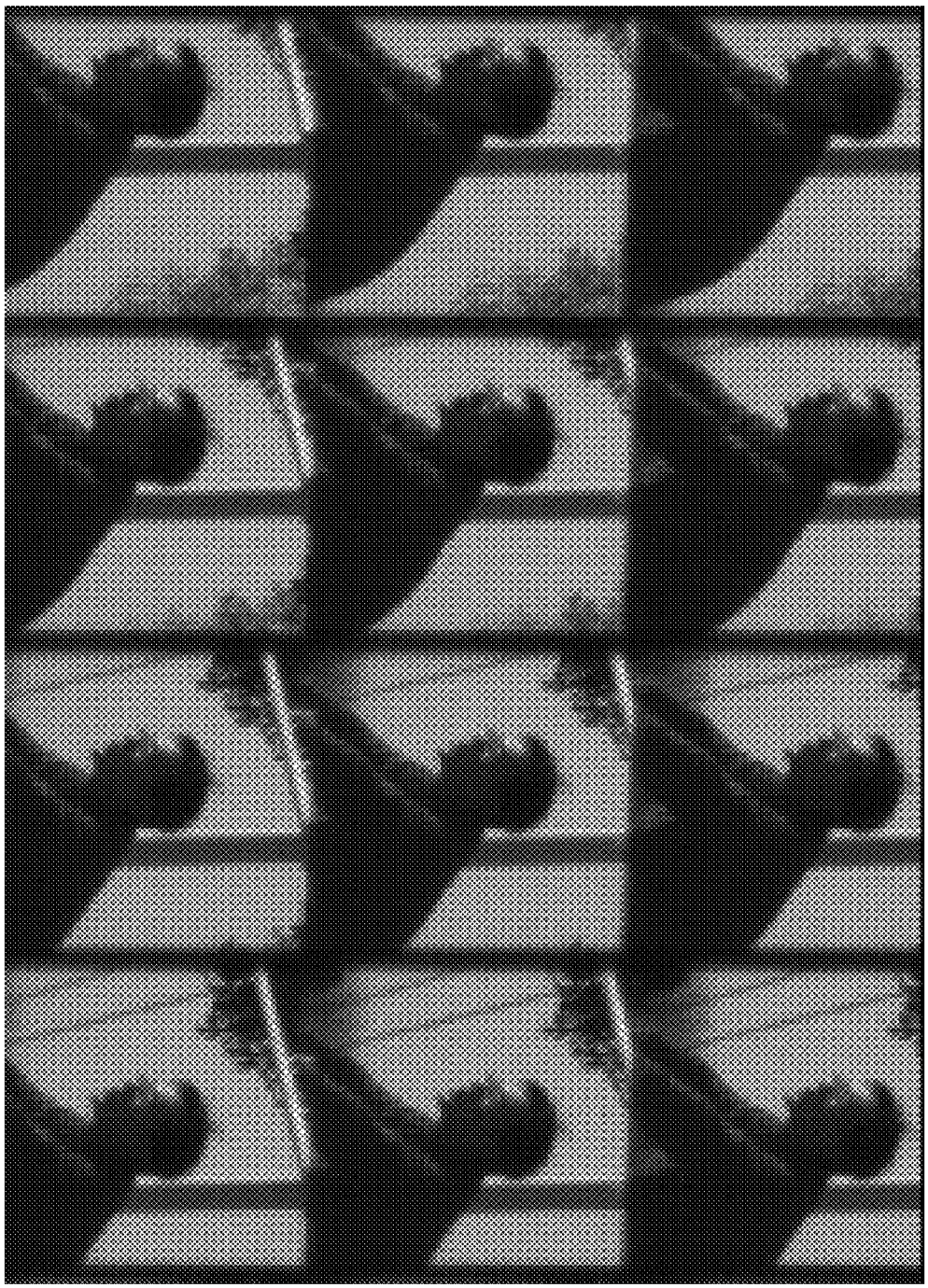
FIG. 34 shows a crop from an input image captured with an embodiment of a focused plenoptic camera.

FIG. 34 shows an example crop from an example raw image as captured by an embodiment of a focused plenoptic camera. This raw image consists of many microimages, one for each microlens in the microlens array; the crop shown in FIG. 34 shows twelve microimages. In each microimage, different points are captured from different parts of the main camera lens because the microlenses see the image of the main lens in such a way that each pixel in a given microimage is from a slightly different viewpoint, and each microlens captures a slightly different part of the main camera lens.

The following may reference FIG. 23. An image or flat captured with a focused plenoptic camera consists of many microimages, as noted above. Each microimage captures a mixture of positional and angular information in front of a respective microlens. In front of the microlens, imagine a plane where the main lens is focused. On that plane, there is position (x,y position). At each (x,y) point, there is also directional information (i.e., the angle a light ray comes from.) In FIG. 23, the (x,y) positions are combined as one dimension, q. The other dimension, p, represents the angular data. Thus, p and q are the two axes as shown in FIG. 23; q is position on the image plane, and p is the angle at each q, that is the angle the light rays hit each q.

In a microimage from the image shown in FIG. 34, q is the (x,y) position of a pixel, and p is the angle at which each ray is hitting the image. The rays intersecting different points in one microimage come from different angles because the rays are from different locations on the main camera lens. Those different angles are represented by p, as illustrated in FIG. 23. The small vertical lines in FIG. 23 each represent a pixel. Note that the pixels are sloped. In an idealized form, each pixel is infinitely thin (infinitely small in the positional direction); in the angular direction, each pixel has some size (the length of the vertical lines representing the pixels). All of the pixels form a line, slanted at the angle $-1/a$, where a and b are parameters of the focused plenoptic camera (see, e.g., FIG. 22). The slanted line in FIG. 23 represents one microimage.

There are multiple microimages in an image (flat) captured with a focused plenoptic camera; each microimage has the properties described above. In the optical phase space, the (q,p) space, all the microimages are lined together as shown in FIG. 24. FIG. 24 shows five long parallelograms, each representing one microimage, and each being shifted relative to the others by some amount in space. The six smaller parallelograms making up each microimage in FIG. 24 represent individual pixels. Each microimage captures different angles, and captures the image at a slightly different position. Thus, all of the microimages sample the full optical phase space of position and angle.

Comparing FIG. 24 to the image shown in FIG. 34, in the captured image of FIG. 34, there is an array of microimages. Taking a given point, e.g. the center of each microimage, the point is slightly shifted from one microimage to the next, just as the point where the parallelograms in FIG. 24 intersect the q axis are slightly shifted from one to the next. However, the images in FIG. 24 are stacked together, not in one dimension but in two dimensions, both horizontal and vertical.

A challenge is to generate a focused, super-resolved representation from the microimages as shown in FIGS. 24 and 34. The following discussion describes how this can be done using a super-resolved demosaicing technique.

FIG. 25 illustrates a simplified representation of FIG. 24; in FIG. 25, the microimages are shown as straight lines. Imagine an image at each line (microimage) in FIG. 25, for example the microimages from FIG. 34. The image is repeated multiple times; each image is very similar, but not exactly the same. The difference is that each microimage is sampled at a slightly different location, as previously described, due to the optical characteristics of the focused plenoptic camera. Therefore, a pixel capturing a grayscale or color value is positioned slightly different in each microimage. This can be seen in the ropes of the swing in FIG. 34; the ropes do not look exactly the same from one microimage to next; the difference is at the subpixel level. Note that each pixel is a small square or rectangle, and not a point. The structure of this rectangle needs to be recovered in the final image. On one microimage, a pixel looks like, and is, a constant color, but the same pixel on another microimage may be a slightly different color. If the microimages are shifted by a subpixel amount and mixed, a better representation of each rectangle (pixel) may be recovered.

Referring again to FIG. 24, the task is to generate a final image from the microimages. Many different images could be generating, depending on what is in focus. Choosing the depth at which to focus is equivalent to choosing an angle in the (q,p) space. In the simplest case, the angle would be vertical, or slightly tilted. This angle defines projection. The microimages are to be projected on the q axis. Only one microimage could be projected, which would yield a nice representation, but at low resolution. For higher resolution, all of the microimages should be projected onto the q axis. To obtain a quality image at this higher resolution, the multiple microimages need to be mixed somehow while projecting the microimages onto the q axis.

Figure 26:
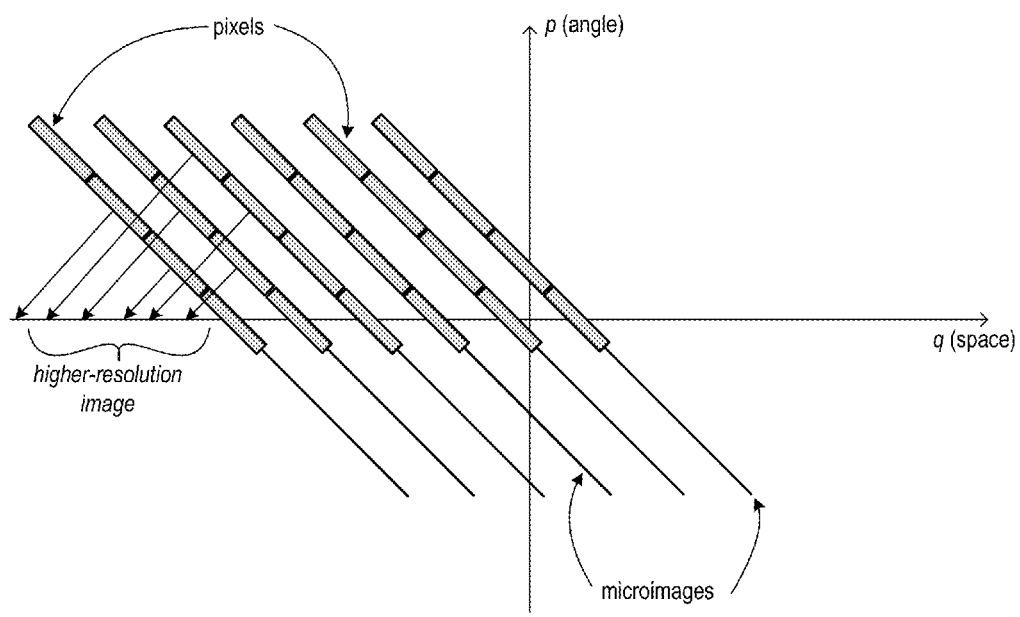
FIG. 26 illustrates projecting pixels according to a conventional super-resolution technique.

The following generally describes the standard super-resolution algorithm described earlier in the document, for example in reference to FIG. 9, and represented as conventional super-resolution rendering 3020 of FIG. 20. Consider the leftmost microimage in FIG. 24 as the first microimage. Projecting the third pixel of this microimage vertically, this third pixel may be exactly like the first pixel in the second microimage, which is above it. This is true if the projection is vertical, which is the case if the image is directly in focus. If the image is not directly in focus, the projection has to be performed at a slightly tilted angle. FIG. 26 illustrates this type of projection. In some cases the angle may be such that the first pixel of the second microimage falls exactly between the second and third pixels of the first microimage. With this projection, approximately 2× higher density of the pixels will be achieved when projected on the q axis than can be achieved with conventional rendering techniques. Essentially, resolution may be doubled by choosing a slightly tilted angle of projection. With a little more tilt to properly align the pixels, the resolution may be increased 3×, with one pixel from a first microimage, one pixel from a second microimage, and one pixel from a third microimage, and repeating with other pixels from the first second and third microimages. Thus, in the standard super-resolution algorithm as illustrated in FIG. 9, pixels are simply fitted between each other; the pixels slightly overlap. Deconvolution may be applied, and so on, as previously described (see, e.g., FIG. 9).

Figure 30:
FIG. 30 illustrates a portion of a Bayer pattern.
Figure 31:
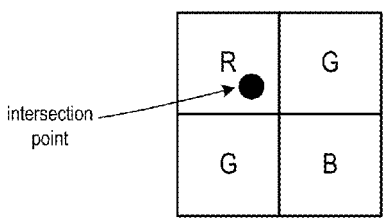
FIGS. 31 through 33D illustrate example pixel sampling patterns for images captured with photosensor arrays that capture different channels at different pixels that may be used in various embodiments of the super-resolved demosaicing technique.

However, photosensors in many digital cameras are constructed so that different pixels capture different colors. An example is the Bayer array photosensor or Bayer pattern for RGB colors. FIG. 30 illustrates a portion of a Bayer pattern. In a Bayer array photosensor, the pixels are arranged in 2×2 squares, for example in an R-G-G-B pattern with one red pixel, two green pixels, and one blue pixel. See, for example, FIG. 31. Note that other photosensors may be configured to capture other types of colors than RGB color, or may exhibit different patterns of pixels; the Bayer array and pattern as illustrated in FIGS. 30 and 31 is just one example.

This aspect of digital cameras brings up the following question: using a photosensor in which different pixels capture different colors and are arranged in some pattern, such as a Bayer array photosensor, when projection is done at a slightly tilted angle, what color will be projected on the q axis? For best results, more than one color should be projected. So a task is to find the best color for a given point q. Compared to the projection technique used in the standard super-resolution algorithm, for example as illustrated in FIG. 9, the super-resolved demosaicing technique essentially turns things around, projecting from the given point through the microimages to determine the color at that point.

Figure 27:
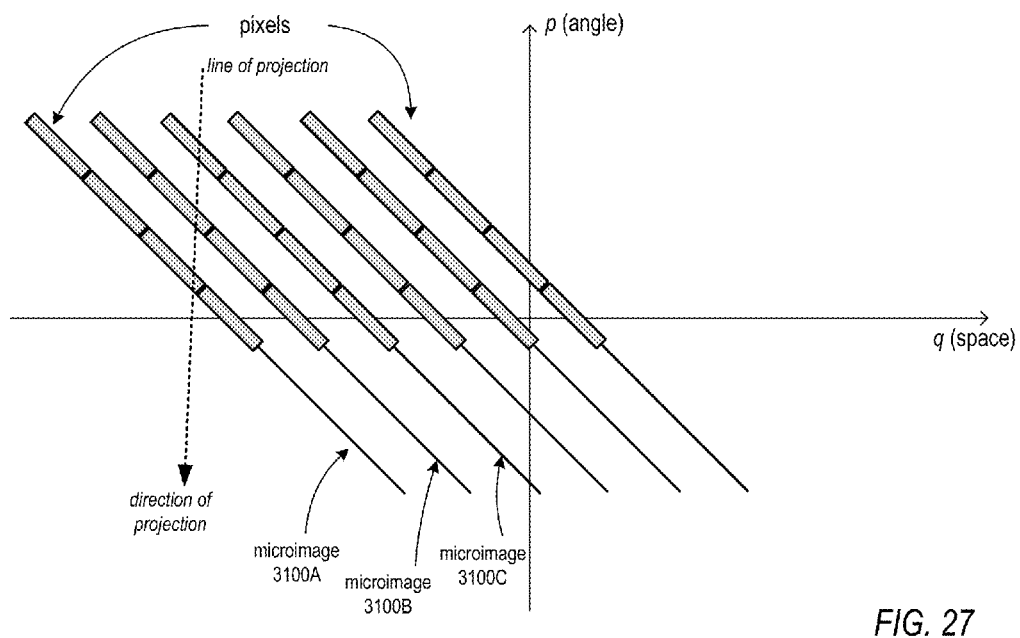
FIGS. 27 and 28 illustrate a line of projection through a stack of microimages, according to embodiments of the super-resolved demosaicing technique.
Figure 28:
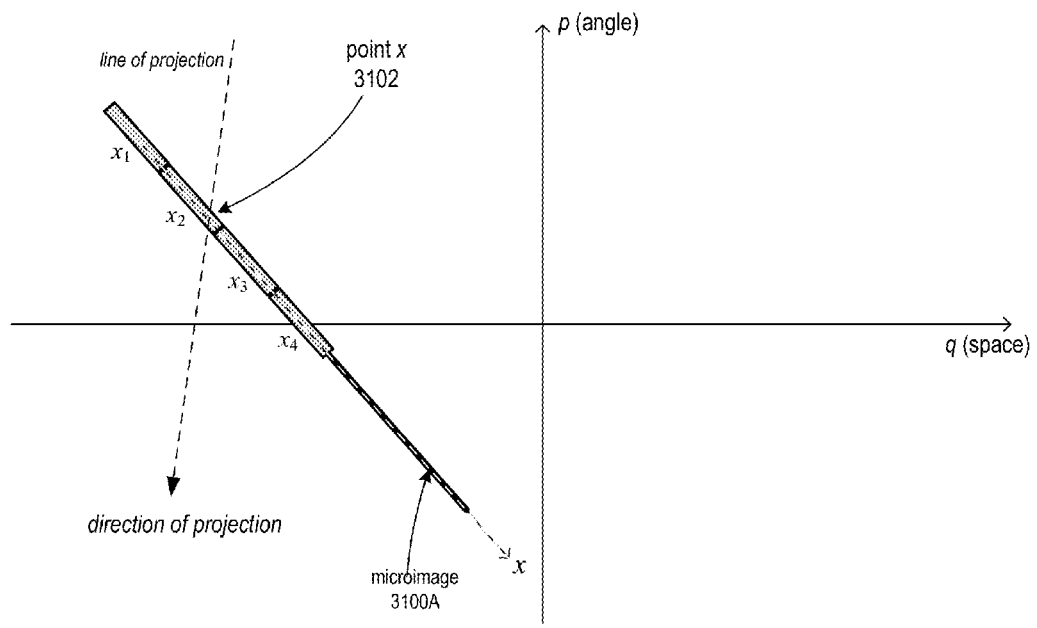
Figure 29:
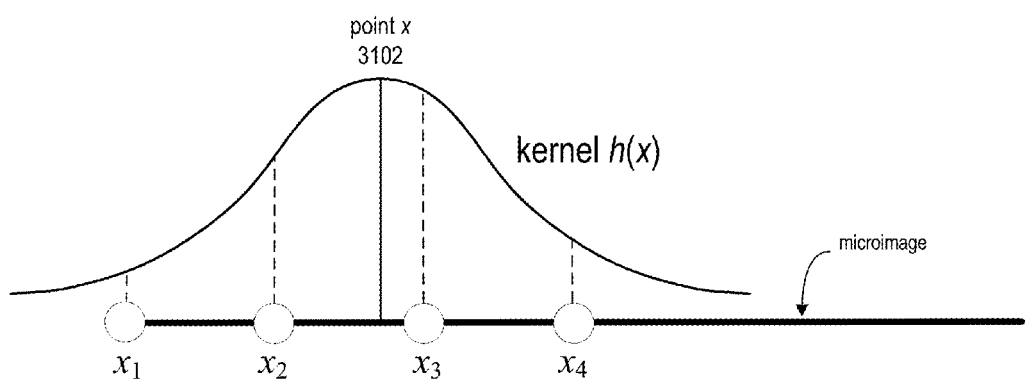
FIG. 29 graphically illustrates an example kernel that may be used in at least some embodiments of the super-resolved demosaicing technique.

FIGS. 27 through 29 graphically illustrate aspects of the super-resolved demosaicing technique. In the super-resolved demosaicing technique, to find a color, a point on the q axis is picked, and the color is determined for the point from multiple microimages. Along with a selected angle of projection, the point on the q axis defines one line of projection. This line of projection crosses the entire stack of microimages. The line generally, but does not always, go through a pixel in a given microimage; the line may pass between pixels. Furthermore, the line may pass through the center of a pixel, or through some other point on the pixel. Also note that the line pass close to several nearby pixels with centers at varying distances from the intersection point. The super-resolved demosaicing technique thus assumes a certain influence of a given pixel on each microimage on the line of projection. The line of projection defines the center of a kernel. The kernel provides certain weight to pixels that are at certain distances from the point of intersection of the line of projection with the given microimage. In at least some embodiments, the kernel may be a Gaussian kernel (see, e.g., FIG. 29). Other types of kernels may be used. The following is the formulation for an example kernel that may be used in some embodiments:

$$f(x) = \sum_{k=0}^{K-1} c_k h(x - x_k)$$

where h is the interpolation kernel weighted by coefficients $C_k$ and applied to K data samples, $X_k$.

The kernel is used to sample pixel values from the microimages. Embodiments take a pixel from q, and draw the projection line (according to a selected angle) that crosses many microimages in the image stack. In each microimage, according to the distance of the neighboring pixels to this intersectional line, the kernel gives certain weights to certain pixels. Color channels are taken into consideration. For example, in an RGB image, the red, green and blue pixels are accumulated and averaged separately. Once the calculations are performed for one such line, the result is an average value for each color channel according to the kernel (e.g., an average of each of red, green and blue pixels). These values may be normalized, e.g. divided by a normalization metric for the kernel, to get the pixel value (e.g., the RGB value) of this point on the q axis. This is performed for all the pixels to generate a final, super-resolved image (see, e.g., FIG. 40). In at least some embodiments, a deconvolution technique may be applied to the final image after all the pixels have been generated by the super-resolved demosaicing technique.

Figure 41:
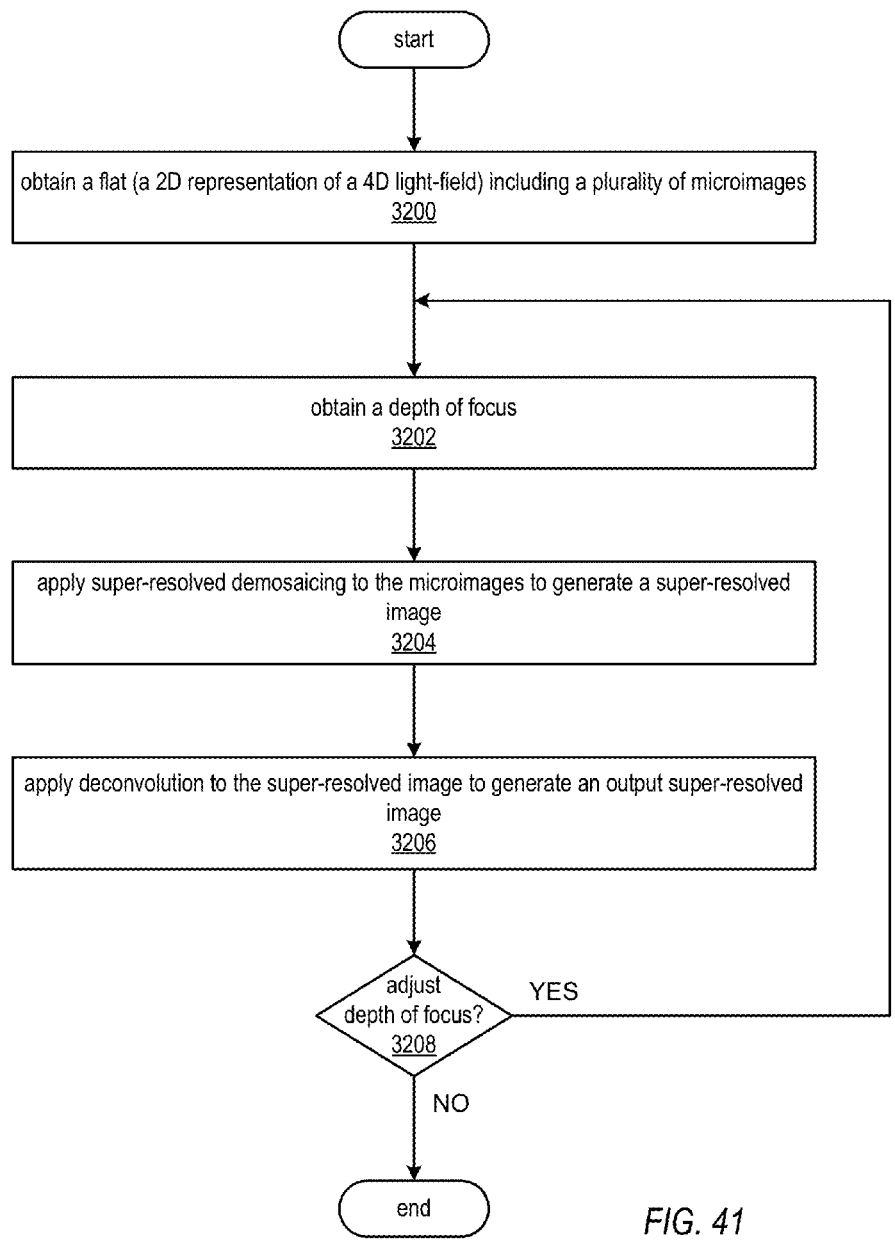
FIG. 41 is a flowchart of a pipeline for processing a flat captured with a focused plenoptic camera to render a super-resolved image, according to at least some embodiments of the super-resolved demosaicing technique.
Figure 42:
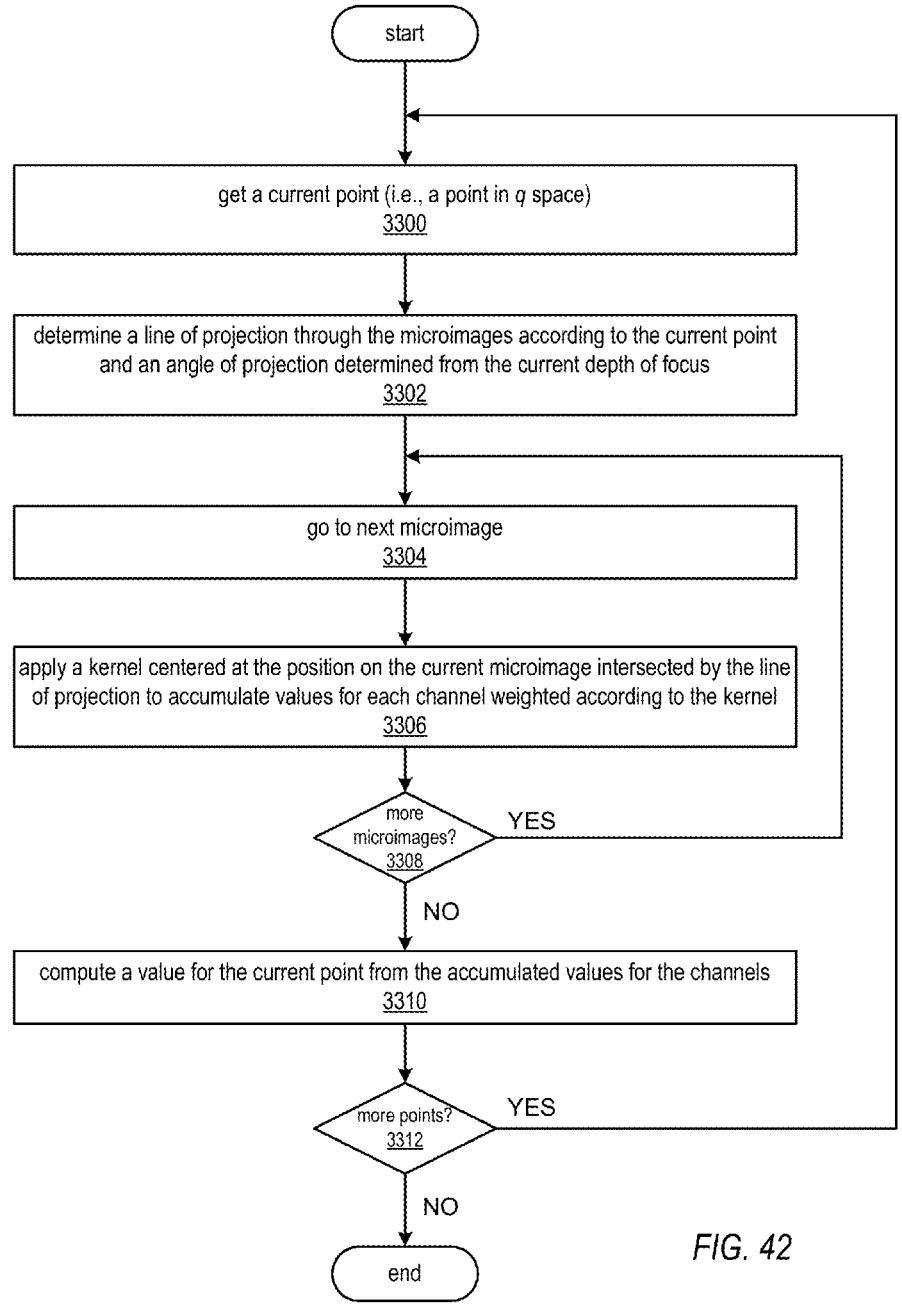
FIG. 42 is a flowchart of a super-resolved deconvolution technique, according to at least some embodiments.

FIG. 41 is a flowchart of a pipeline for processing a flat captured with a focused plenoptic camera to render a super-resolved image, according to at least some embodiments of the super-resolved demosaicing technique. As indicated at 3200, a flat (a 2D representation of a 4D light-field) including a plurality of microimages may be obtained. The flat may have been captured by an embodiment of a focused plenoptic camera as described herein. As indicated at 3202, a depth of focus may be obtained. For example, a user interface may include a user interface element, for example a slider bar, via which a user may interactively select a depth of focus. See, for example, FIG. 43. Note that the currently selected depth of focus determines the angle of projection used in the super-resolved demosaicing technique. As indicated at 3204, a super-resolved demosaicing technique may be applied to the microimages in the input image according to the current depth of focus to generate a super-resolved image from the microimages. FIG. 42 provides a flowchart of a super-resolved demosaicing technique that may be applied, according to at least some embodiments. As indicated at 3206 of FIG. 41, in at least some embodiments, deconvolution may be applied to the super-resolved image output by the super-resolved demosaicing technique to generate an output super-resolved image.

Depending on the results (i.e., the quality of the output super-resolved image), the depth of focus may need to be adjusted. Note that the microimages may be viewed as a stack; adjusting the depth of focus may be viewed as shifting each of the microimages by some differing amount in the stack in two dimensions (vertically and horizontally). See FIG. 27 for a graphic representation of the microimages in a stack, and a line of projection through the stack; the angle of the line of projection is determined by the current depth of focus. At 3208 of FIG. 41, if the depth of focus is to be adjusted, the method returns to element 3202. For example, a user may visually examine the results and, if the user so desires, the user may change the depth of focus via a user interface element (e.g., by moving a slider bar) to interactively generate a new output super-resolved image according to the new depth of focus. See, for example, FIG. 43. At 3208 of FIG. 41, if the depth of focus is not to be adjusted (e.g., if the user is satisfied with the results), the method is done.

FIG. 42 is a flowchart of a super-resolved deconvolution technique that may be applied at 3204 of the method illustrated in FIG. 41, according to at least some embodiments. As indicated at 3300 of FIG. 42, a current point (i.e., a point in q space) may be obtained. This point corresponds to a point on the super-resolved image for which channel values are to be generated (i.e., RGB values in an RGB color image format). As indicated at 3302, a line of projection through the microimages may be determined according to the current point and an angle of projection determined from the current depth of focus. FIGS. 27 and 28 illustrate a line of projection through a stack of microimages. At 3304 of FIG. 42, the technique goes to a next microimage. Note that the microimages may be, but are not necessarily, processed in an order from a first microimage as viewed in a stack to a last microimage in the stack. As indicated at 3306, a kernel, for example a Gaussian kernel as illustrated in FIG. 29, centered at the position on the current microimage intersected by the line of projection (see, e.g., point x 3102 in FIG. 28, the center of the Gaussian kernel shown in FIG. 29), may be applied to accumulate values for each channel weighted according to the kernel. In accumulating values for each channel at a given microimage, a sampling pattern, relative to the intersection point of the line of projection with the microimage, may be applied to select pixels from which values for particular channels are to be accumulated. See FIGS. 31, 32, and 33A through 33D for examples of sampling patterns that may be used in various embodiments.

At 3308 of FIG. 42, if there are more microimages to be processed, the method returns to element 3304 to get a next microimage. As previously noted, the method may, but does not necessarily, process the microimages in a specified order, e.g. in an order the microimages appear if viewed as a stack. In practice, the microimages are arranged in the input image in a two-dimensional grid (see, e.g., FIG. 34); the loop indicated by elements 3304 through 3308 that processes each point in q space may start at some microimage, and at each iteration shift some number of pixels (e.g., up, down, left, or right) from the microimage determined by the geometry of the microimages to another microimage. At 3308 of FIG. 42, if all the microimages have been processed, then the method goes to element 3310.

At 3310, a color for the current point may be computed from the accumulated values for the channels for this point. For example, the accumulated value for each channel may be normalized according to the kernel.

Sampling

FIGS. 27 through 33 illustrate various aspects of sampling in a super-resolved demosaicing technique, according to at least some embodiments.

FIG. 27 illustrates microimages 3100 viewed as a stack in (q, p) space, and shows a line of projection through the microimages, the angle of which is determined by a current depth of focus. The technique needs to determine what values to read for each channel (e.g., RGB channels) at each microimage (e.g., at microimages 3100A, 3100B, and 3100C).

FIG. 28 illustrates a point x 3102 on microimage 3100A at which the line of projection intersects the microimage. The point x 3102 defines the sampled pixel values based on the kernel shown in FIG. 29. In at least some embodiments, the kernel weights the values accumulated from a pixel (e.g., pixel $x_1$, $x_2$, $x_3$, or $x_4$) according to the distance of the pixel from point x 3102. In at least some embodiments, the kernel may be a Gaussian kernel. However, other types of kernels may be used. The following is the formulation for an example kernel that may be used in some embodiments:

$$f(x) = \sum_{k=0}^{K-1} c_k h(x - x_k)$$

where h is the interpolation kernel weighted by coefficients $C_k$ and applied to K data samples, $X_k$.

Referring to FIG. 28, the super-resolved demosaicing technique computes values sampled at microimage 3100A based on the kernel, centered at point x 3102. The technique then similarly adds in values sampled from the other microimages using the kernel centered at the corresponding intersection points (x', x", . . . ) on those microimages. After all microimages are processed, the final sum is normalized, e.g. by the total weight. The following may be used to sum and normalize the values from all microimages:

$$f(x) = \Sigma c_k h_1(x'-x_k) + \Sigma c_k h_2(x''-x_k) + \ldots$$

FIG. 30 illustrates a portion of a Bayer pattern as an example of a photosensor arrays that captures multiple channels, with different channels captured at different pixels. In an example Bayer array photosensor, the pixels are arranged in 2×2 squares in an RGGB pattern, with two green pixels, one red pixel, and one blue pixel. See, for example, FIG. 31. Note that other photosensors may be configured to capture other types of colors than RGB, or may exhibit different patterns of pixels; the Bayer array photosensor and pattern is just one example.

Figure 32:
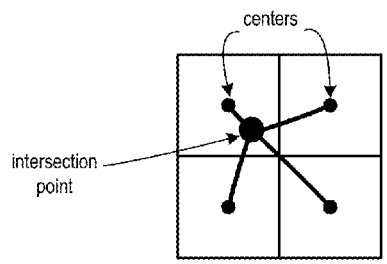

FIGS. 31 through 33 illustrate example pixel sampling patterns for images captured with photosensor arrays that capture different channels at different pixels that may be used in various embodiments of the super-resolved demosaicing technique. The Bayer array photosensor pattern is used as an example; other photosensor patterns may be similarly sampled. The black circle in each of these Figures represents an intersection point of the line of projection on a given microimage (see, e.g., FIGS. 27 and 28). Note that these sampling patterns are given as examples; other sampling patterns may be used in some embodiments.

FIG. 31 illustrates a relatively simple nearest neighbor (relative to the intersection point) sampling pattern. In the example, the red (R) pixel includes the intersection point, and is selected; note that pixels in other channels may be selected, for example on other microimages. Also note that the pixels are not points, but rectangles or squares; sampling is done at the subpixel level. This sampling gives weight to the selected pixel proportional to $\exp{-\alpha r^2}$, where r is the distance to the center of the selected pixel (in this example, the red (R) pixel).

FIG. 32 illustrates a sampling pattern that samples from the four nearest neighbor pixels, relative to the intersection point. This sampling pattern samples all four pixels with weights determined by the distances to the centers of the four pixels. Note that the intersection point may be in an R, G, or B pixel.

Figure 33A:
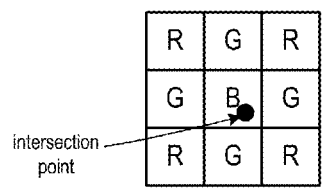
Figure 33B:
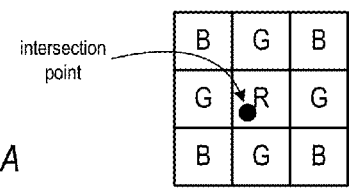
Figure 33C:
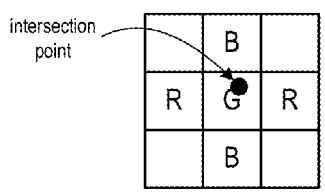
Figure 33D:
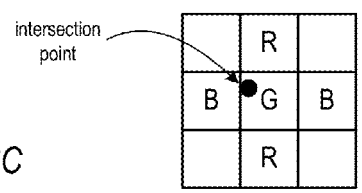

FIGS. 33A through 33D illustrate a 3×3 sampling pattern. In this sampling pattern, the intersected pixel and neighboring pixels to the intersected pixels are sampled with weights determined by the distances to the centers of the pixels. However, what neighboring pixels are sampled may depend upon the channel of the intersected pixel. FIG. 33A shows a blue pixel as the intersected pixel; in this case, all eight neighbors (which are all red or green pixels) are sampled. FIG. 33B shows a red pixel as the intersected pixel; in this case, all eight neighbors (which are all blue or green pixels) are sampled. FIGS. 33C and 33D show the two cases in the Bayer pattern where a green pixel is intersected. In these cases, only the red and blue neighbor pixels are sampled; since the green pixel is intersected, this pixel is assumed to have the best value for the green channel, and thus the other green pixels may not be sampled. Thus, in these two cases where a green pixel is intersected, only five pixels are sampled according to the kernel to accumulate values into the red, green, and blue accumulators.

Super-Resolved Demosaicing Technique Example User Interface

Figure 43:
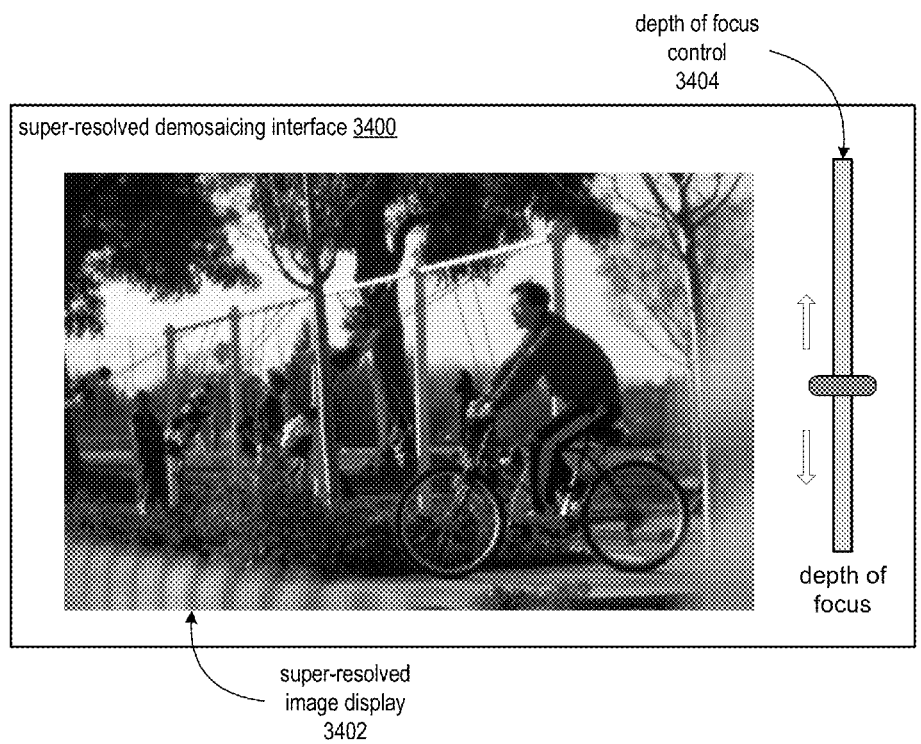
FIG. 43 shows an example user interface, according to some embodiments, to a pipeline for processing a flat captured with a focused plenoptic camera to render a super-resolved image.

FIG. 43 shows an example user interface, according to some embodiments, to a pipeline for processing a flat captured with a focused plenoptic camera to render a super-resolved image, for example as shown in FIG. 41. Embodiments may provide a user interface 3400 and user interface elements (e.g., super-resolved image display 3402 and depth of focus control 3404) via which a user can interactively apply the super-resolved demosaicing technique to an input image (flat) captured with focused plenoptic camera technology. In at least some embodiments, the user interface may provide a depth of focus control 3404. A slider bar or other user interface element or elements may be provided via which the user can change the angle of the line of projection; changing this angle is equivalent to changing the depth of focus used in the super-resolved demosaicing technique; i.e. the angle determines the depth of focus, or vice versa. Generally, a particular angle will result in the best focusing, and thus will yield the best sharpness or resolution at certain depths, i.e. at certain image planes. In some embodiments, this technique may provide immediate feedback; that is, the user may adjust the user interface element 3404 and almost immediately see the results on the super-resolved image display 3402. Thus, the user may tweak the user interface element 3404 to quickly determine the best, near-best, or desired depth of focus to generate a high-quality, super-resolved output image from an input flat captured according to focused plenoptic camera technology. In at least some embodiments, the super-resolved demosaicing technique as described herein may be implemented, at least in part, as a graphics processing unit (GPU) application executable on a GPU.

Examples Results for the Super-Resolved Demosaicing Technique

FIGS. 34 through 40 show image examples that demonstrate individual steps from the super-resolved demosaicing technique according to at least some embodiments, and also compare the results to previous techniques. Note that the images in FIGS. 34 through 40 were captured in color; however, the images have been converted to grayscale for this document.

Figure 35A:
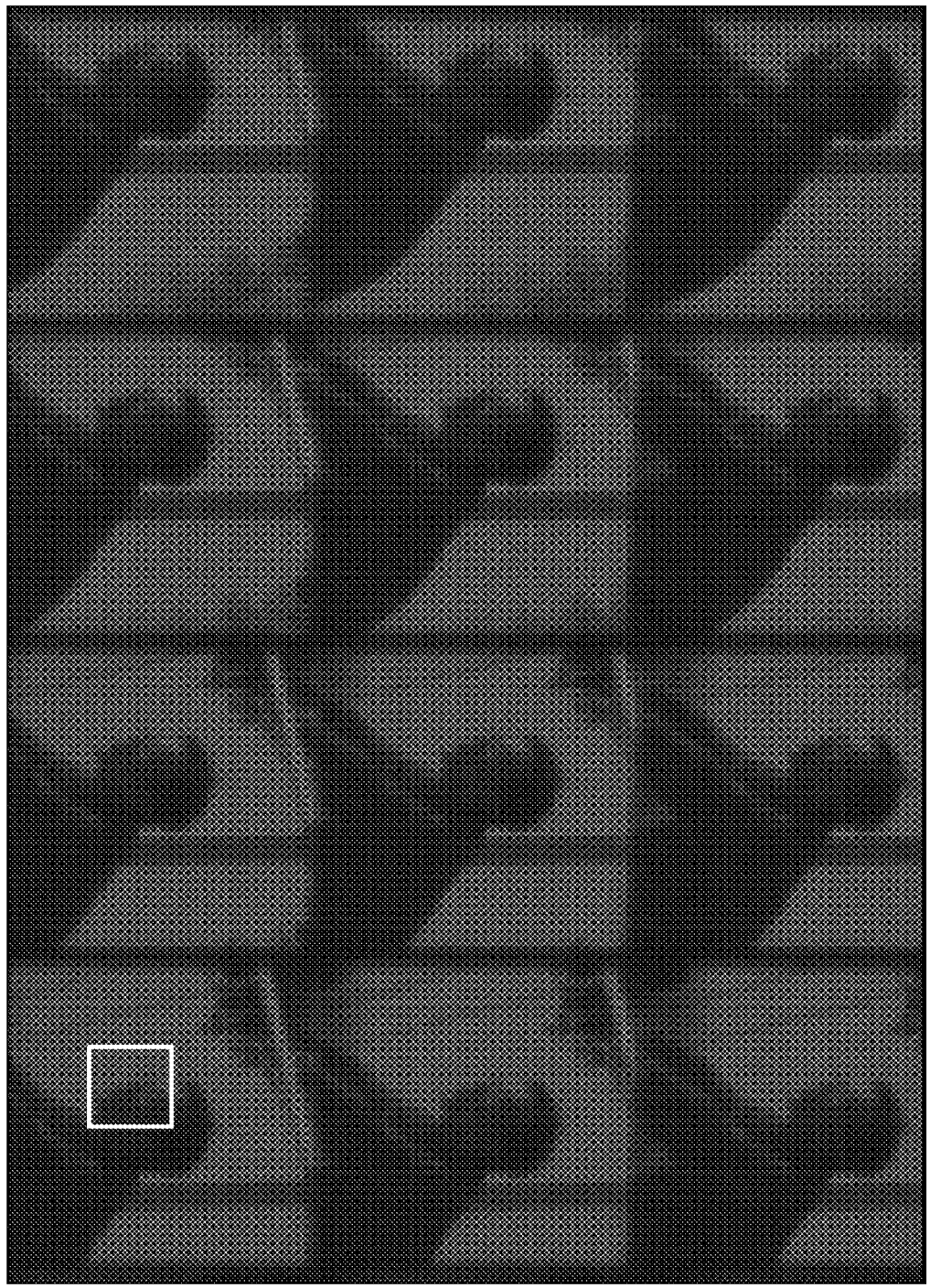
FIG. 35A shows the same crop of FIG. 60 with Bayer filter colors indicated.
Figure 35B:
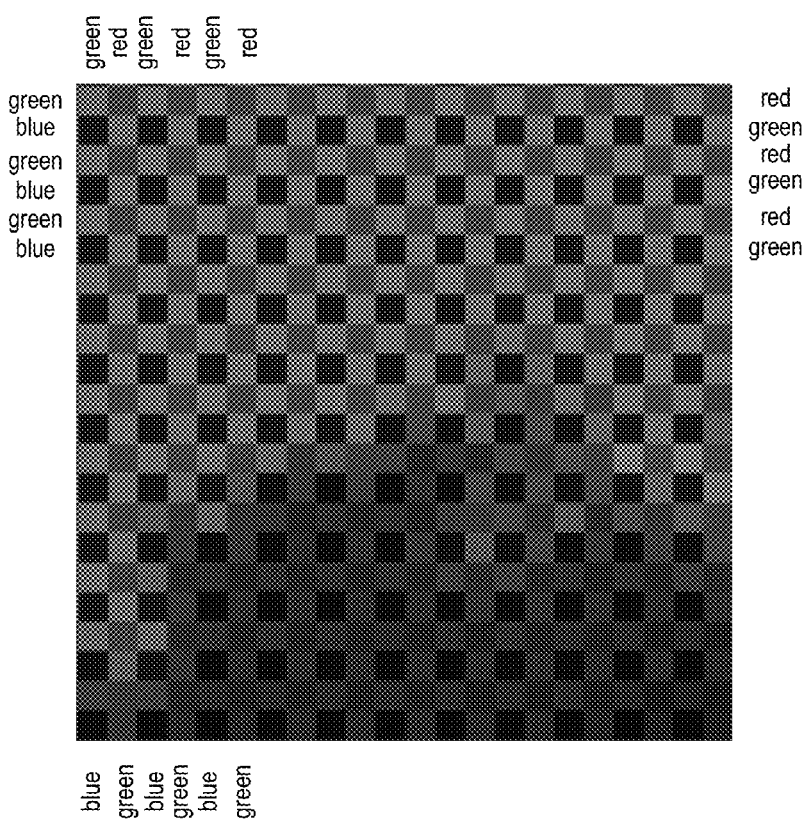
FIG. 35B shows a zoom-in to the white square area indicated in one of the microimages of FIG. 35A.

FIG. 34 shows a crop from an input image captured, for example, with an example of a focused plenoptic camera as described herein. Note that the image was captured in color; however, the image has been converted to grayscale for this document. Twelve microimages are shown in the crop. FIG. 35A shows the same crop from the input image with Bayer filter colors indicated. FIG. 35B shows a zoom-in to the white square area indicated in one of the microimages of FIG. 35A. As is shown in FIG. 35B, in a raw image captured with a Bayer array, rows and columns of pixels either alternate red, green, red, green . . . etc. or blue, green, blue, green . . . etc. Note that other types of photosensors may have similar patterns of alternating channels in the pixels, and the techniques described herein for super-resolved demosaicing may be applied to images captured using those other photosensors, possibly with minor adjustments.

Figure 36:
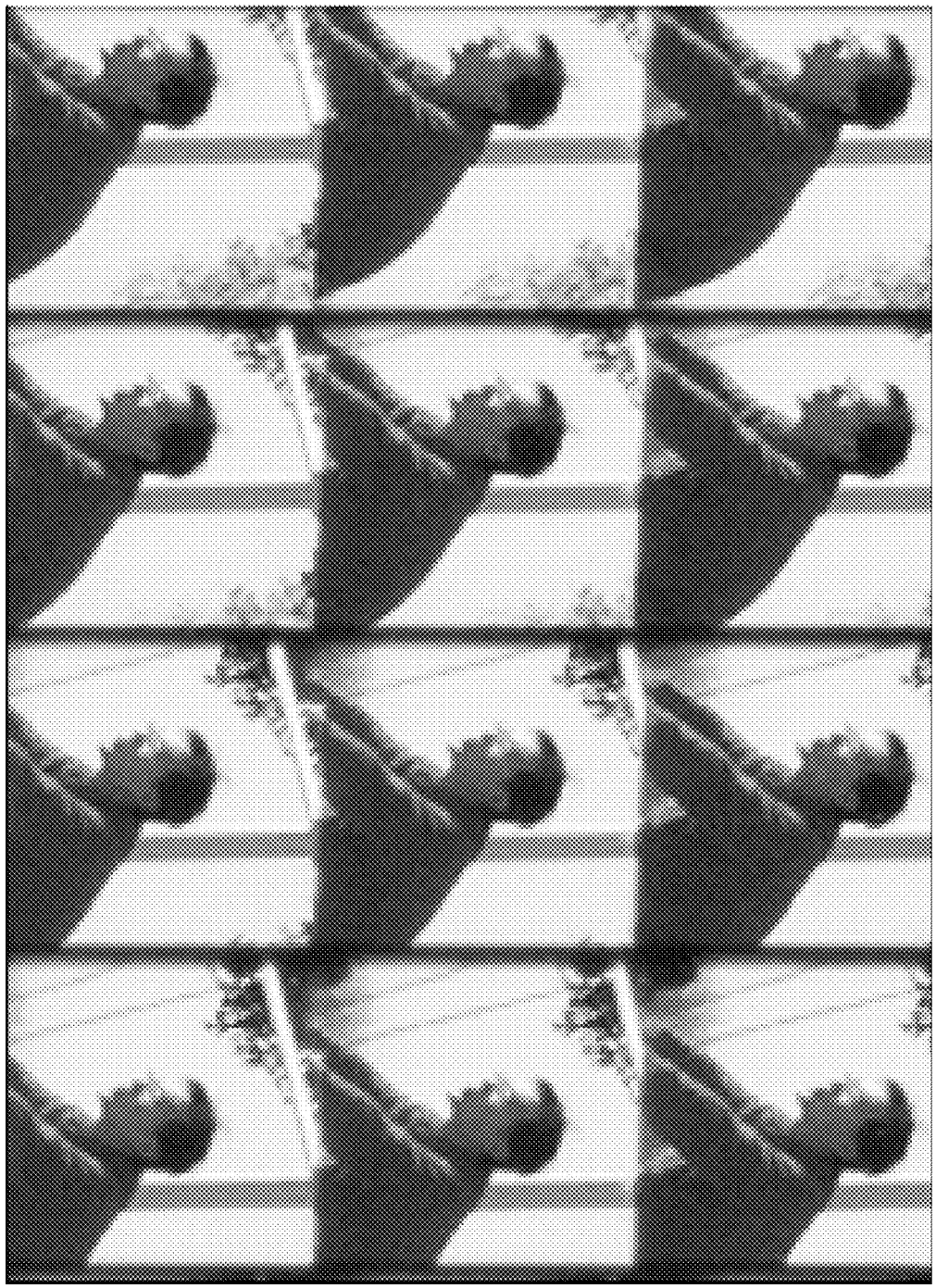
FIG. 36 shows the resulting image generated by conventional demosaicing applied to the input image shown in FIGS. 60 and 61A.
Figure 37:
FIG. 37 shows a final image generated from the input image of FIG. 60 with no super-resolution applied.
Figure 38:
FIG. 38 shows a final image generated using a super-resolution technique that applies super-resolution to an intermediate image generated by a separate, conventional demosaicing step.

FIG. 36 shows an example resulting image generated by conventional demosaicing applied to the input image shown in FIG. 34. FIG. 37 shows a final image generated from the input image of FIG. 34 without applying super-resolution. FIG. 38 shows a final image generated using the standard super-resolution pipeline that applies super-resolution to an intermediate image generated by a separate, conventional demosaicing step (see, e.g., FIGS. 9 and 20). The image in FIG. 36 corresponds to color image 3002 in the pipeline shown in FIG. 20, and the image in FIG. 38 corresponds to output image 3004 shown in FIG. 20.

Figure 39:
FIG. 39 shows a final image generated according to a super-resolved demosaicing technique that performs simultaneous super-resolution and demosaicing.
Figure 40:
FIG. 40 shows a more complete final image generated from the original input image according to the super-resolved demosaicing technique.

FIG. 39 shows a final image generated according to the super-resolved demosaicing technique as described herein that performs simultaneous super-resolution and demosaicing, for example as shown in FIG. 21, super-resolved demosaicing technique 3040. FIG. 39 thus corresponds to final image 3032 of FIG. 21. FIG. 39 can be compared to FIG. 38 to compare the quality of the results of the super-resolved demosaicing technique shown in FIG. 21 the standard super-resolving pipeline shown in FIG. 20. For example, it can be seen in FIG. 39 that the swing hangs on chains, not on ropes. This detail is not visible in FIG. 38, and also cannot be detected in any obvious way in the input image (FIG. 34). FIG. 40 shows a more complete final image generated from the original input image (FIG. 34) according to the super-resolved demosaicing technique as described herein.

Example Implementations of Rendering Methods

Figure 44:
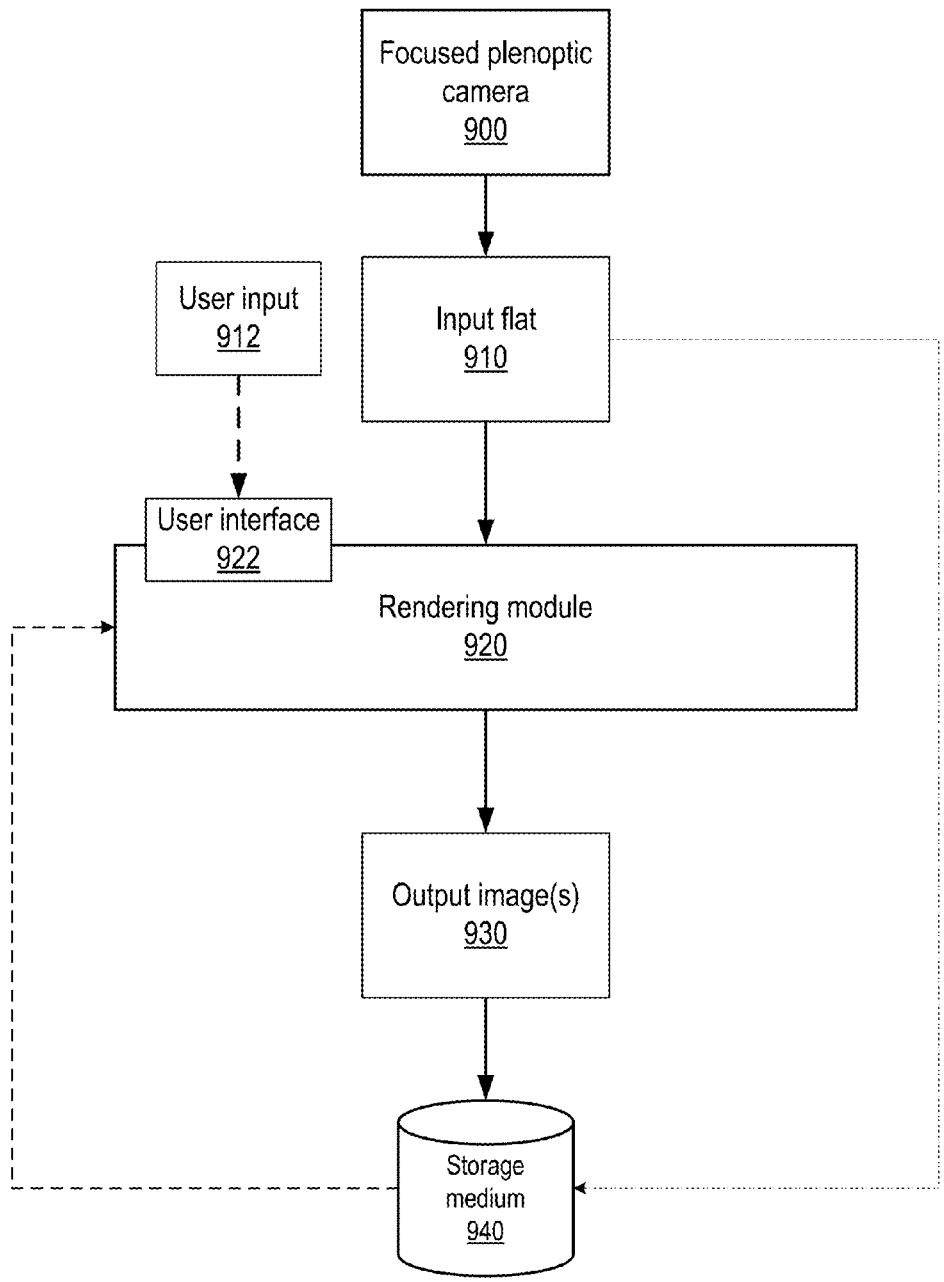
FIG. 44 illustrates a rendering module rendering a high-resolution image from a flat captured, for example, by a focused plenoptic camera, according to some embodiments.
Figure 45:
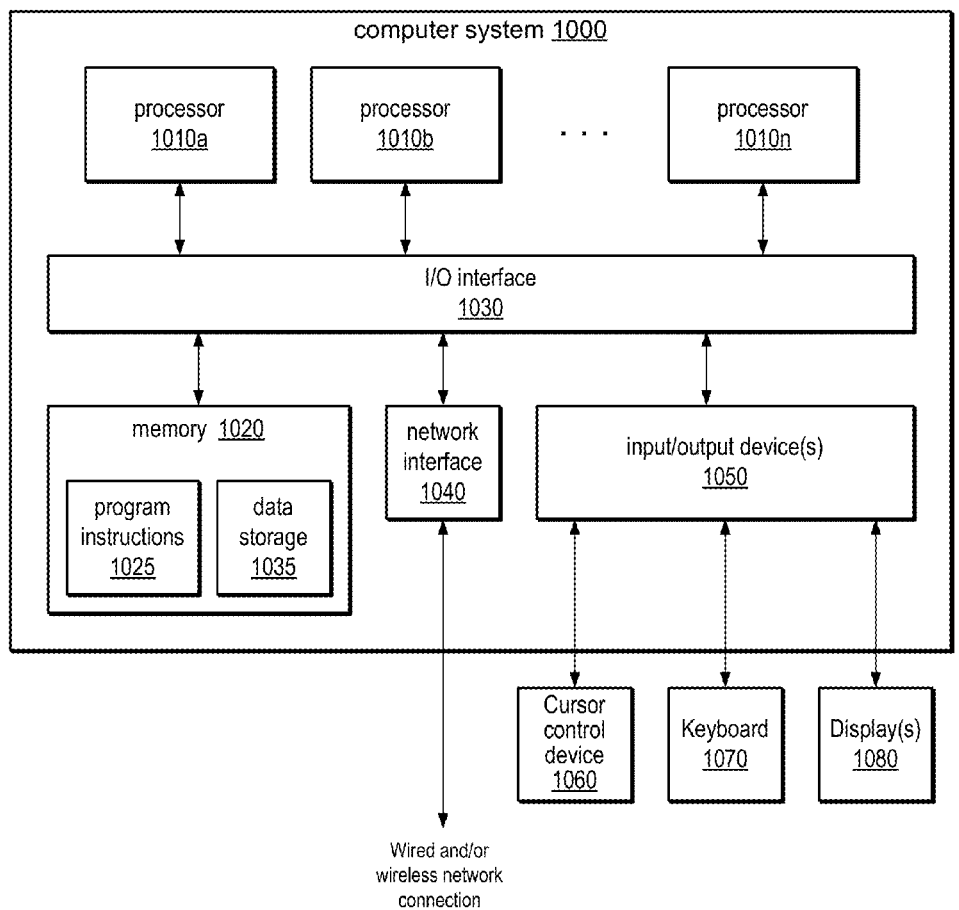
FIG. 45 illustrates an example computer system that may be used in embodiments.

Embodiments of the super-resolved demosaicing technique may be performed by a rendering module implemented by program instructions stored in a computer-readable storage medium and executable by one or more processors (e.g., one or more CPUs or GPUs) of a computer system or other device. FIG. 44 illustrates a rendering module that may render images from flats captured by various embodiments of a focused plenoptic camera. Rendering module 920 may, for example, implement super-resolved demosaicing methods as illustrated in FIGS. 21 through 33. FIG. 45 illustrates an example computer system on which embodiments of rendering module 920 may be implemented. In some embodiments of a focused plenoptic camera, rendering module 920 may be implemented in the camera, e.g. in a captured data processing module. Referring to FIG. 44, rendering module 920 receives an input flat 910 captured by a focused plenoptic camera. An example portion of a flat as may be captured by various embodiments of a focused plenoptic camera is illustrated in FIGS. 34 and 35. Rendering module 920 then processes the input image 910 according to a super-resolved demosaicing technique, for example as illustrated in FIGS. 21, 41, and 42. Rendering module 920 generates as output one or more images 930. FIGS. 39 and 40 illustrate example super-resolved images that may be rendered according to a super-resolved demosaicing technique, for example as illustrated in FIGS. 21, 41, and 42. Output image 930 may, for example, be stored to a storage medium 940, such as system memory, a disk drive, DVD, CD, etc. The dashed line from input image 910 to storage medium 940 indicates that the original (input) flat 910 may also be stored. The dashed line from storage medium 940 to rendering module 920 indicates that stored images may be retrieved and processed by rendering module 920.

In some embodiments, rendering module 920 may provide a user interface 922 via which a user may interact with the module 920, for example to specify or otherwise manage input flats 910 and output images 930 as described herein. The user interface 922 may also provide one or more user interface elements whereby the user may select parameters of the super-resolution rendering method, such as the depth of focus, to be used to super-resolve a flat according to the super-resolved demosaicing technique. An example user interface is shown in FIG. 43.

Example System

Embodiments of a rendering module as illustrated in FIG. 44 and/or the super-resolved demosaicing technique or portions thereof as described herein may be executed on one or more computer systems, which may interact with various other devices. One such computer system is illustrated by FIG. 45. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some embodiments, computer system 1000 may be a digital camera.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the super-resolved demosaicing technique disclosed herein may be implemented at least in part by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a rendering module and/or of a super-resolution demosaicing technique are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 45, memory 1020 may include program instructions 1025, configured to implement embodiments of a rendering module as described herein, and data storage 1035, comprising various data accessible by program instructions 1025. In one embodiment, program instructions 1025 may include software elements of embodiments of a rendering module and/or of a super-resolution demosaicing technique as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a rendering module and/or of super-resolution demosaicing technique as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    rendering an output image of a scene from a plurality of separate microimages of an image of the scene at a depth of focus that defines an angle of projection in an optical phase space, each microimage of the plurality of separate microimages corresponding to a microlens in a microlens array, distance between the microimages being a nonintegral pixel value, at least two microimages overlapping at least in part, the rendering comprising, for a point on an image plane of the output image:
        determining a line of projection through the microimages in optical phase space according to the point and the angle of projection determined from the depth of focus;
        for each microimage, applying a kernel centered at a position on the microimage intersected by the line of projection to accumulate, from pixels at each of the plurality of microimages covered by the kernel at the respective position, values for each color channel accumulated from the plurality of microimages and calculated separately, one color channel from another, according to the kernel; and
        computing a value for a pixel at the point in the output image from the values for the color channels that were accumulated and calculated separately.

2. The method as recited in claim 1, wherein the values for each color channel at each microimage are weighted according to distance of the pixels covered by the kernel from the position on the microimage intersected by the line of projection.

3. The method as recited in claim 1, wherein said computing a value for a pixel at the point in the output image from the accumulated values for the color channels comprises computing a value for each color channel of the pixel in the output image from the accumulated value for a corresponding color channel.

4. The method as recited in claim 3, wherein said computing a value for each color channel of the pixel in the output image from the accumulated value for a corresponding color channel comprises normalizing the accumulated values according to a normalization metric for the kernel.

5. The method as recited in claim 1, wherein the kernel is a Gaussian kernel.

6. The method as recited in claim 1, wherein the input image is captured according to a photosensor technology that captures a pattern of pixels in multiple separate color channels.

7. The method as recited in claim 6, wherein the photosensor is a Bayer array photosensor.

8. The method as recited in claim 1, wherein the pixels in the input image are RGB technology pixels.

9. The method as recited in claim 1, further comprising applying a deconvolution technique to the output image.

10. The method as recited in claim 1, further comprising:
    obtaining a different depth of focus, wherein the different depth of focus determines a different angle of projection in optical phase space; and
    repeating said rendering at the different depth of focus to generate a second output image at the different depth of focus.

11. One or more computer-readable storage memory comprising program instructions stored thereon, the program instructions are computer-executable to cause operations to be performed comprising:
    rendering an output image of a scene from a plurality of separate microimages of an image of the scene at a depth of focus that defines an angle of projection in an optical phase space, each microimage of the plurality of separate microimages corresponding to a microlens in a microlens array, distance between the microimages being a nonintegral pixel value, at least two microimages overlapping at least in part, the rendering comprising, for a point on an image plane of the output image comprising:
        determining a line of projection through the microimages in optical phase space according to the point and the angle of projection determined from the depth of focus;
        for each microimage, applying a kernel centered at a position on the microimage intersected by the line of projection to accumulate, from pixels at each of the plurality of microimages covered by the kernel at the respective position, values for each color channel accumulated from the plurality of microimages and calculated separately, one color channel from another, according to the kernel; and
        computing a value for a pixel at the point in the output image from the values for the color channels that were accumulated and calculated separately.

12. The one or more computer-readable storage memory as recited in claim 11, wherein the values for each color channel at each microimage are weighted according to distance of the pixels covered by the kernel from the position on the microimage intersected by the line of projection.

13. The one or more computer-readable storage memory as recited in claim 11, wherein, in said computing a value for a pixel at the point in the output image from the accumulated values for the color channels, the program instructions are computer-executable to implement computing a value for each color channel of the pixel in the output image from the accumulated value for a corresponding color channel.

14. The one or more computer-readable storage memory as recited in claim 11, wherein the input image is captured according to a photosensor technology that captures a pattern of pixels in multiple separate color channels.

15. The one or more computer-readable storage memory as recited in claim 11, wherein the program instructions are computer-executable to implement:
obtaining a different depth of focus, wherein the different depth of focus determines a different angle of projection in optical phase space; and
repeating said rendering at the different depth of focus to generate a second high resolution output image at the different depth of focus.

16. A system, comprising
at least one processor; and
a memory comprising program instructions that are executable by the at least one processor to:
obtain an input image comprising a plurality of separate microimages of an image of a scene, each microimage of the plurality of separate microimages corresponding to a microlens in a microlens array, the input image includes pixels in multiple separate color channels;
obtain a depth of focus for an output image to be rendered from the input image, the depth of focus defining an angle of projection in optical phase space; and
render an output image of the scene from the plurality of separate microimages at the depth of focus, distance between the microimages being a nonintegral pixel value, at least two microimages overlapping at least in part, the rendering comprising, for a point on an image plane of the output image:
determine a line of projection through the microimages in optical phase space according to the point and the angle of projection determined from the depth of focus;
for each microimage, apply a kernel centered at a position on the microimage intersected by the line of projection to accumulate, from pixels at each of the plurality of microimages covered by the kernel at the respective position, values for each color channel accumulated from the plurality of microimages and calculated separately, one color channel from another, according to the kernel; and
compute a value for a pixel at the point in the output image from the values for the color channels that were accumulated and calculated separately.

17. The system as recited in claim 16, wherein the values for each color channel at each microimage are weighted according to distance of the pixels covered by the kernel from the position on the microimage intersected by the line of projection.

18. The system as recited in claim 16, wherein, to compute a value for a pixel at the current point in the output image from the accumulated values for the color channels, the program instructions are executable by the at least one processor to compute a value for each color channel of the pixel in the output image from the accumulated value for a corresponding color channel.

19. The system as recited in claim 16, wherein the program instructions are executable by the at least one processor to:
obtain a different depth of focus, wherein the different depth of focus determines a different angle of projection in optical phase space; and
repeat said rendering at the different depth of focus to generate a second output image at the different depth of focus.

20. The system as recited in claim 16, wherein the at least one processor includes at least one graphics processing unit (GPU).

* * * * *